(12) United States Patent
Oishi et al.

(10) Patent No.: US 8,763,486 B2
(45) Date of Patent: Jul. 1, 2014

(54) STEPWISE AUTOMATIC TRANSMISSION FOR SADDLE RIDING TYPE VEHICLE, POWER UNIT EQUIPPED WITH THE SAME, AND SADDLE RIDING TYPE VEHICLE EQUIPPED WITH THE SAME

(75) Inventors: Akifumi Oishi, Shizuoka (JP); Shinichiro Hata, Shizuoka (JP); Takuji Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 436 days.

(21) Appl. No.: 13/057,801

(22) PCT Filed: Jan. 16, 2009

(86) PCT No.: PCT/JP2009/000139
§ 371 (c)(1),
(2), (4) Date: Feb. 7, 2011

(87) PCT Pub. No.: WO2010/016161
PCT Pub. Date: Feb. 11, 2010

(65) Prior Publication Data
US 2011/0259696 A1 Oct. 27, 2011

(30) Foreign Application Priority Data
Aug. 8, 2008 (JP) .................. 2008-204928

(51) Int. Cl.
*F16H 57/02* (2012.01)
(52) U.S. Cl.
USPC ........................................... 74/333; 180/230
(58) Field of Classification Search
USPC .................... 74/333, 331; 180/230
See application file for complete search history.

(56) References Cited

U.S. PATENT DOCUMENTS

| 4,364,445 A | 12/1982 | Iizuka et al. |
| 4,736,809 A * | 4/1988 | Kumazawa ................... 180/339 |

(Continued)

FOREIGN PATENT DOCUMENTS

| JP | 56-142773 A | 11/1981 |
| JP | 57-022448 A | 2/1982 |

(Continued)

OTHER PUBLICATIONS

Official Communication issued in corresponding European Patent Application No. 09804648.5, mailed on Jul. 18, 2011.

(Continued)

*Primary Examiner* — William C Joyce
(74) *Attorney, Agent, or Firm* — Keating & Bennett, LLP

(57) ABSTRACT

In a stepwise automatic transmission, a mass is concentrated in a longitudinal direction thereof. The stepwise automatic transmission includes an input shaft, an intermediate shaft, an output shaft, a first clutch which is connected and disconnected in accordance with a rotation speed of the input shaft, first and second power transmission mechanisms, and a second clutch which is connected and disconnected in accordance with rotation speed of the intermediate shaft. The intermediate shaft is disposed rearward of the input shaft. When the first clutch is connected, the first power transmission mechanism transmits rotation of the input shaft to the intermediate shaft. The second clutch is provided on the intermediate shaft. When the second clutch is connected, the second power transmission mechanism transmits rotation of the intermediate shaft to the output shaft. A front end of the second clutch is located forward of a rear end of the first clutch as viewed from an axial direction of the input shaft.

12 Claims, 14 Drawing Sheets

(56) References Cited

U.S. PATENT DOCUMENTS

| | | | |
|---|---|---|---|
| 7,490,688 B2 * | 2/2009 | Yamamoto | 180/228 |
| 2007/0074593 A1 * | 4/2007 | Mizuno et al. | 74/330 |
| 2007/0240531 A1 | 10/2007 | Endo et al. | |

FOREIGN PATENT DOCUMENTS

| | | | |
|---|---|---|---|
| JP | 61-262263 A | | 11/1986 |
| JP | 62-23349 Y2 | | 6/1987 |
| JP | 2006-105131 | * | 4/2006 |
| JP | 2007-278329 A | | 10/2007 |
| JP | 2007-285372 A | | 11/2007 |

OTHER PUBLICATIONS

Official Communication issued in International Patent Application No. PCT/JP2009/000139, mailed on Feb. 24, 2009.

Oishi et al., "Two-Wheeled Motor Vehicle," U.S. Appl. No. 13/057,803, filed Feb. 7, 2011.

* cited by examiner

STEPWISE AUTOMATIC TRANSMISSION FOR SADDLE RIDING TYPE VEHICLE, POWER UNIT EQUIPPED WITH THE SAME, AND SADDLE RIDING TYPE VEHICLE EQUIPPED WITH THE SAME

BACKGROUND OF THE INVENTION

1. Field of the Invention

The present invention relates to a stepwise automatic transmission for a straddle-type vehicle, a power unit including the stepwise automatic transmission for the straddle-type vehicle, and a straddle-type vehicle including the power unit.

2. Description of the Related Art

Conventionally, a stepwise automatic transmission is known. The stepwise automatic transmission generally has higher energy transmitting efficiency than that of a belt type continuously variable transmission. Therefore, the need for stepwise automatic transmissions has been increased in recent years.

For example, Japanese Utility Model Application Laid-Open No. S62-23349 discloses a three-speed stepwise automatic transmission. FIG. 14 is a sectional view of the three-speed stepwise automatic transmission 200 disclosed in the Japanese Utility Model Application Laid-Open No. S62-23349. As shown in FIG. 14, the stepwise automatic transmission 200 includes an automatic centrifugal type start clutch 202 using a planetary gear provided on a left side of a crankshaft 201, and a drive sprocket 203. Rotation of the crankshaft 201 is transmitted to a drive sprocket 203 through the automatic centrifugal type start clutch 202.

A main shaft 204 is disposed behind the crankshaft 201. A driven sprocket 205 is mounted on the main shaft 204. A chain 206 is wound around between the driven sprocket 205 and the drive sprocket 203.

An automatic centrifugal type high speed clutch 207 is disposed on the main shaft 204. In the stepwise automatic transmission 200, gears are shifted between the second speed and the third speed by the automatic centrifugal type high speed clutch 207.

According to the Japanese Utility Model Application Laid-Open No. S62-23349, the automatic centrifugal type start clutch 202 and the automatic centrifugal type high speed clutch 207 are disposed in a longitudinal direction. With this arrangement, a relatively narrow stepwise automatic transmission is achieved.

As shown in FIG. 14, in the stepwise automatic transmission disclosed in the Japanese Utility Model Application Laid-Open No. S62-23349, the automatic centrifugal type start clutch 202 and the automatic centrifugal type high speed clutch 207 which are heavy loads are disposed at a large distance therebetween in the longitudinal direction. Therefore, there is a problem that it is difficult to concentrate a longitudinal mass.

SUMMARY OF THE INVENTION

In view of the above circumstances, preferred embodiments of the present invention concentrate a longitudinal mass in a stepwise automatic transmission.

A stepwise automatic transmission of a straddle-type vehicle according to a preferred embodiment of the present invention includes an input shaft, an intermediate shaft, an output shaft, a first clutch, a first power transmission mechanism, a second clutch and a second power transmission mechanism. The intermediate shaft is disposed rearward of the input shaft. The first clutch is connected and disconnected in accordance with a rotation speed of the input shaft. When the first clutch is connected, the first power transmission mechanism transmits rotation of the input shaft to the intermediate shaft. The second clutch is provided on the intermediate shaft. The second clutch is connected and disconnected in accordance with the rotation speed of the intermediate shaft. When the second clutch is connected, the second power transmission mechanism transmits rotation of the intermediate shaft to the output shaft. In the stepwise automatic transmission of the straddle-type vehicle according to a preferred embodiment of the present invention, a front end of the second clutch is disposed forward of the rear end of the first clutch as viewed from an axial center direction of the input shaft.

The power unit according to another preferred embodiment of the present invention includes the stepwise automatic transmission according to a preferred embodiment of the present invention and a power source which rotates the input shaft.

The straddle-type vehicle according to another preferred embodiment of the present invention includes the power source according to a preferred embodiment of the present invention.

According to various preferred embodiments of the present invention, in a stepwise automatic transmission, it is possible to concentrate a longitudinal mass.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENT

First Preferred Embodiment

One example of preferred embodiments to which the present invention is applied will be described based on a motorcycle 1 shown in FIG. 1. The motorcycle 1 described in this preferred embodiment is a motor scooter. The straddle-type vehicle of the present invention is not limited to the motor scooter. The straddle-type vehicle according to various preferred embodiments of the present invention preferably is a general vehicle on which a rider straddles and rides. An ATV (all terrain vehicle) is also included in the straddle-type vehicle of various preferred embodiments of the present invention in addition to the motorcycle. The ATV is also called an off-road vehicle. In this specification, the motorcycle indicates a vehicle which includes a front wheel and a rear wheel and which changes its traveling direction by inclining the vehicle body. The motorcycle also includes a vehicle configured with two or more front or rear wheels. The motorcycle further includes a motorcycle, a moped, a motor scooter and an off-road vehicle.

An outline structure of the motorcycle 1 will be described with reference to FIG. 1. In the following description, directions such as front, rear, left and right are based on a direction as viewed from a rider who is seated on a seat 14.

Figure 1:
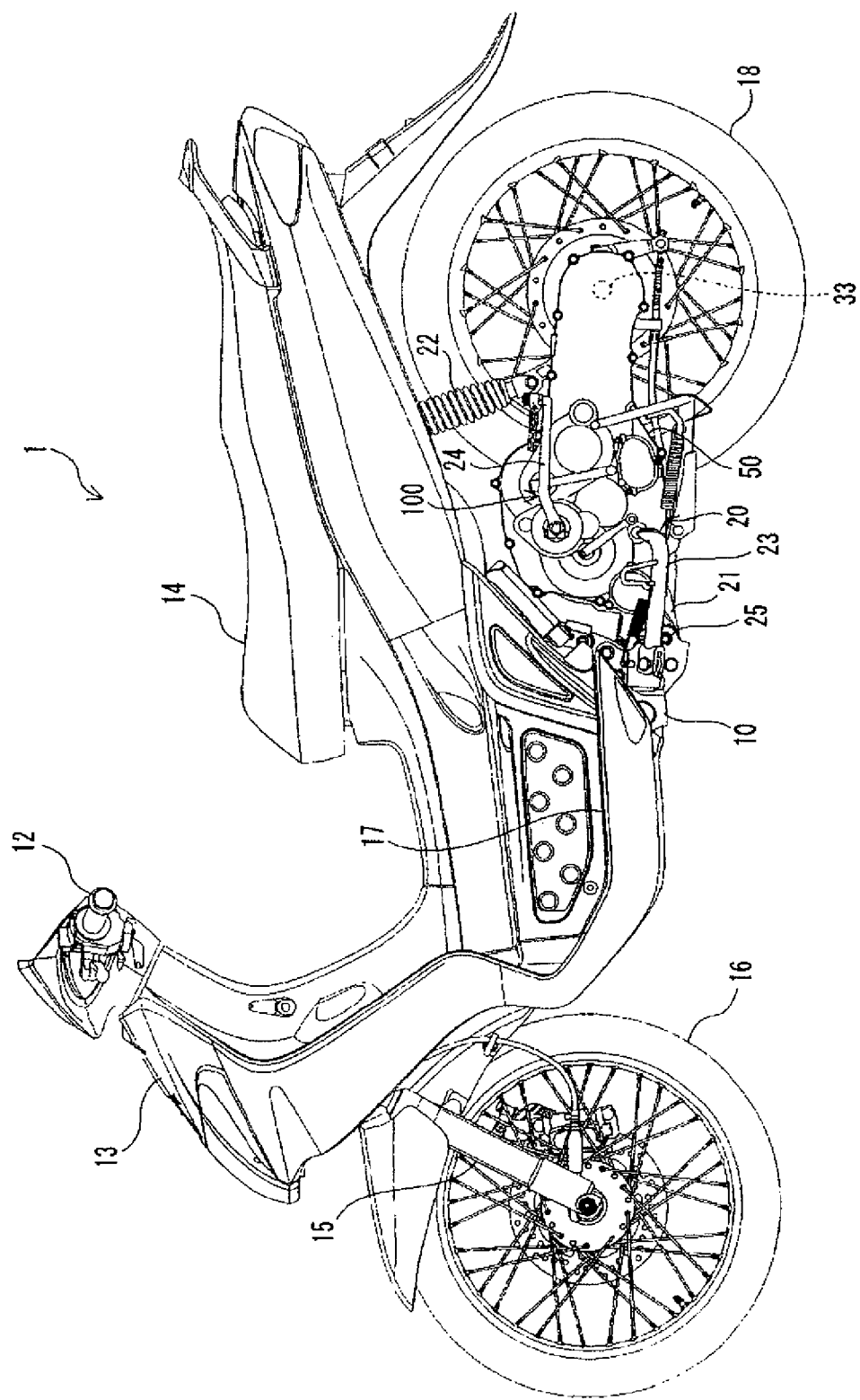
FIG. 1 is a left side view of a motorcycle according to a first preferred embodiment of the present invention.

As shown in FIG. 1, the motorcycle 1 includes a vehicle body frame 10. The vehicle body frame 10 includes a head pipe (not shown). In a front portion of the vehicle, the head pipe extends downward and slightly diagonally forward. A steering shaft (not shown) is rotatably inserted into the head pipe. The steering shaft is provided at its upper end portion with a handle 12. A front fork 15 is connected to a lower end portion of the steering shaft. A front wheel 16 is rotatably mounted on a lower end portion of the front fork 15.

A vehicle body cover 13 is mounted on the vehicle body frame 10. A portion of the vehicle body frame 10 is covered by the vehicle body cover 13. The seat 14 on which a rider takes a seat is mounted on the vehicle body frame 10.

Foot steps 17 on which feet of the rider are placed are provided on both sides of the motorcycle 1 in the vehicle width direction. A side stand 23 is mounted on the vehicle body frame 10 at a substantially central portion of the vehicle.

The motorcycle 1 is provided with an engine unit 20 as a power unit. A rear wheel 18 is mounted on an output shaft 33 of the engine unit 20.

Figure 6:
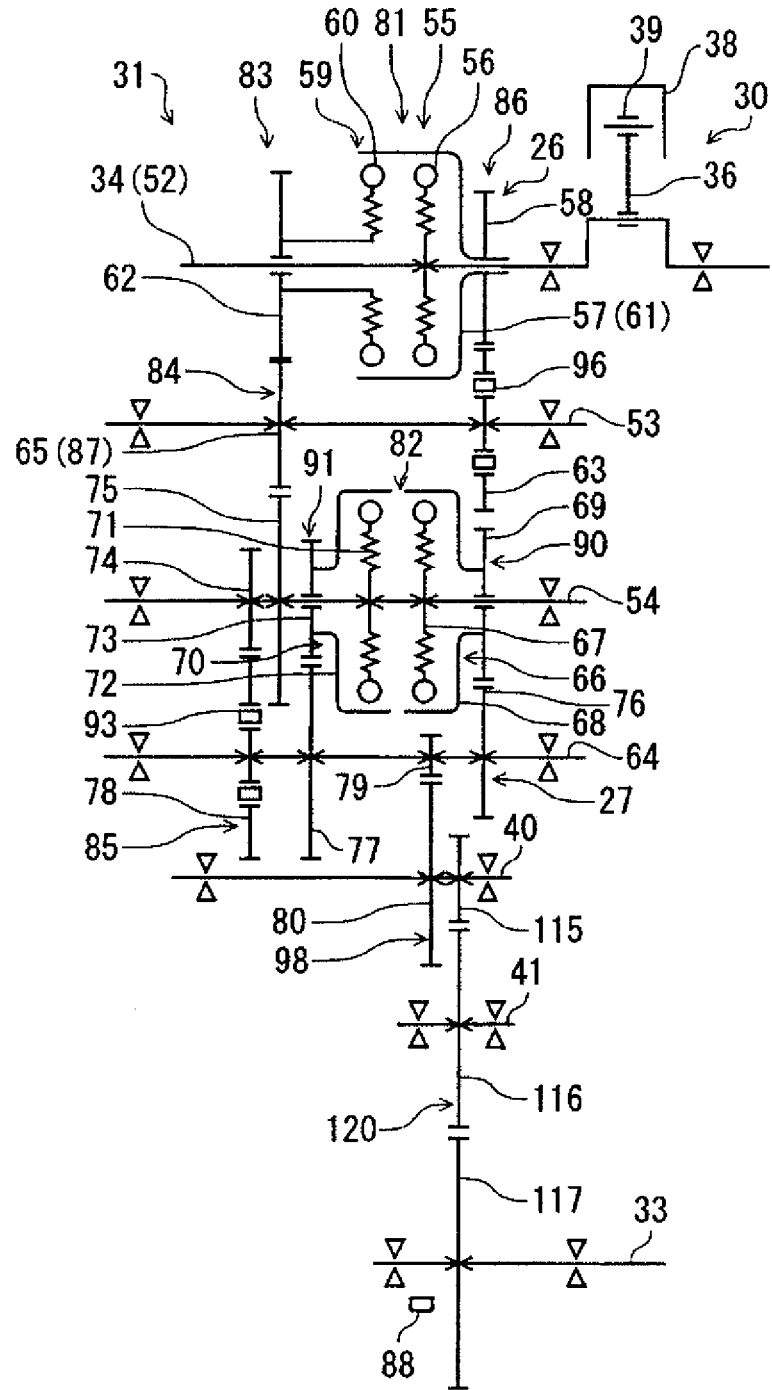
FIG. 6 is a schematic diagram showing a structure of the engine unit.

In this preferred embodiment, as shown in FIG. 6, a vehicle speed sensor 88 is disposed with respect to the output shaft 33. The vehicle speed sensor 88 detects a vehicle speed. The vehicle speed sensor 88 outputs the detected vehicle speed to an ECU (electronic control unit) 138 shown in FIG. 7.

Figure 3:
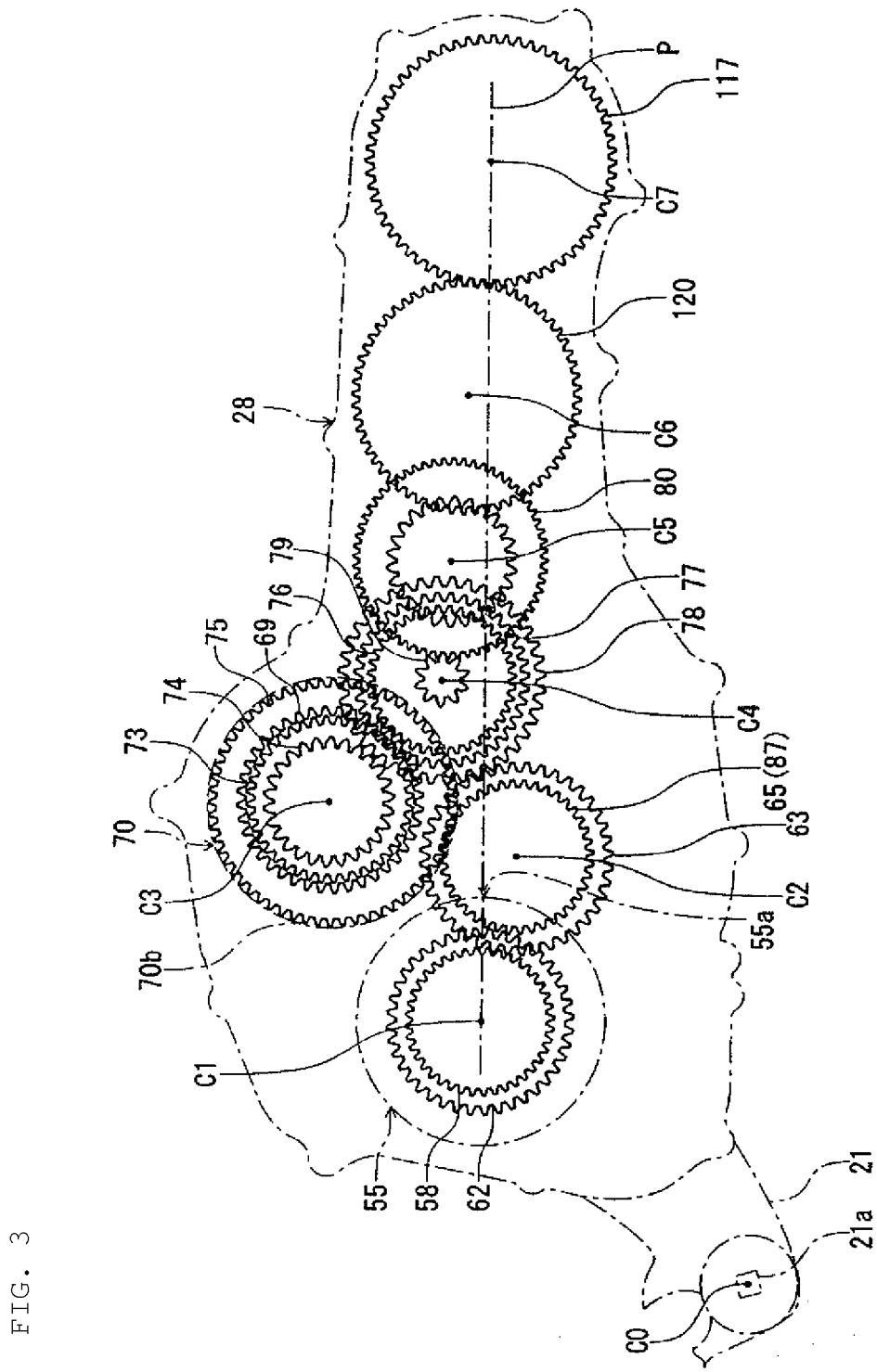
FIG. 3 is a schematic left side view showing a layout of shafts of the engine unit.

The engine unit 20 preferably is a swing type engine unit. The engine unit 20 is suspended by the vehicle body frame 10 so as to be swingable. More specifically, a pivot shaft 25 extending in the vehicle width direction is mounted on the vehicle body frame 10. As shown in FIG. 3, the engine unit 20 includes a casing 28. An engine bracket 21 as a mounting portion is provided on a lower portion of a front side of the casing 28. A mounting hole 21a is formed in the engine bracket 21, and the pivot shaft 25 is fixed to the mounting hole 21a. The pivot shaft 25 is inserted into the mounting hole 21a. With this, the engine unit 20 is mounted so as to be swingable with respect to the vehicle body frame 10.

The engine bracket 21 is located forward of an axial center C1 of an input shaft 52 of a later-described stepwise automatic transmission 31. The engine bracket 21 is located downward of the axial center C1 of the input shaft 52.

A center C0 of the mounting hole 21a is located downward of the axial center C1 of the input shaft 52 as viewed from side. In this specification, the expression "center of the mounting portion as viewed from side" means a center of the mounting hole as viewed from side.

As shown in FIG. 1, cushion units 22 are mounted between the engine unit 20 and the vehicle body frame 10. The swinging motion of the engine unit 20 is suppressed by the cushion units 20.

Figure 2:
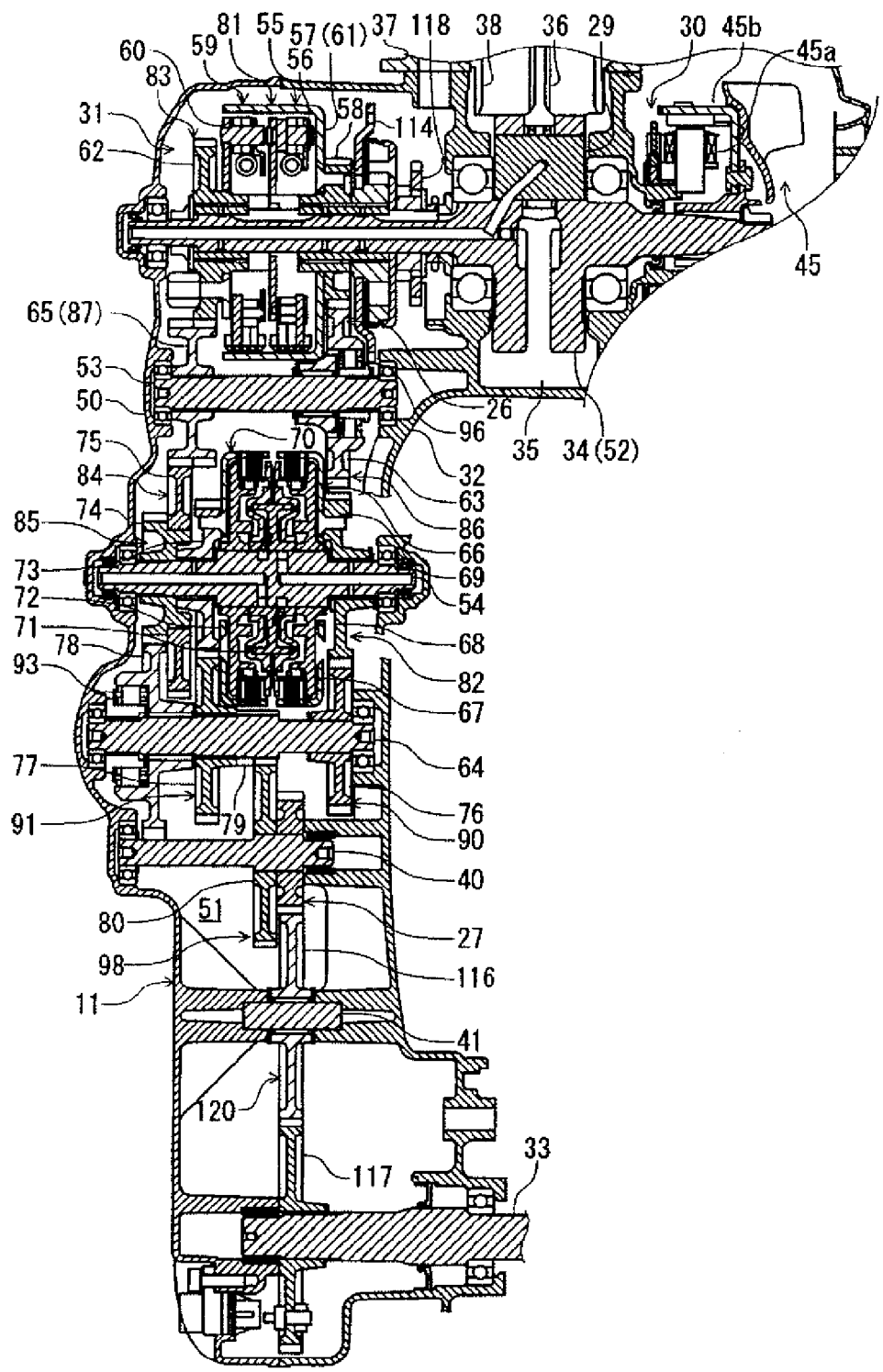
FIG. 2 is a sectional view of an engine unit.

Next, a structure of the engine unit 20 will be described with reference to FIGS. 2 to 8. As shown in FIG. 2, the engine unit 20 includes an engine 30 as a power source, and the stepwise automatic transmission 31.

In this specification, the "power source" means a mechanism which generates power, and an engine and a motor are preferably included in the "power source".

The engine 30 includes a crankcase 32. The crankcase 32 constitutes the casing 28 together with a later-described transmission cover 50 and a power generator cover (not shown).

A crank chamber 35 is provided in the crankcase 32. A crankshaft 34 extending in the vehicle width direction is accommodated in the crank chamber 35. A connecting rod 36 is connected to the crankshaft 34 via a crankpin 29. A piston 39 shown in FIG. 6 is mounted on a tip end of the connecting rod 36.

Figure 8:
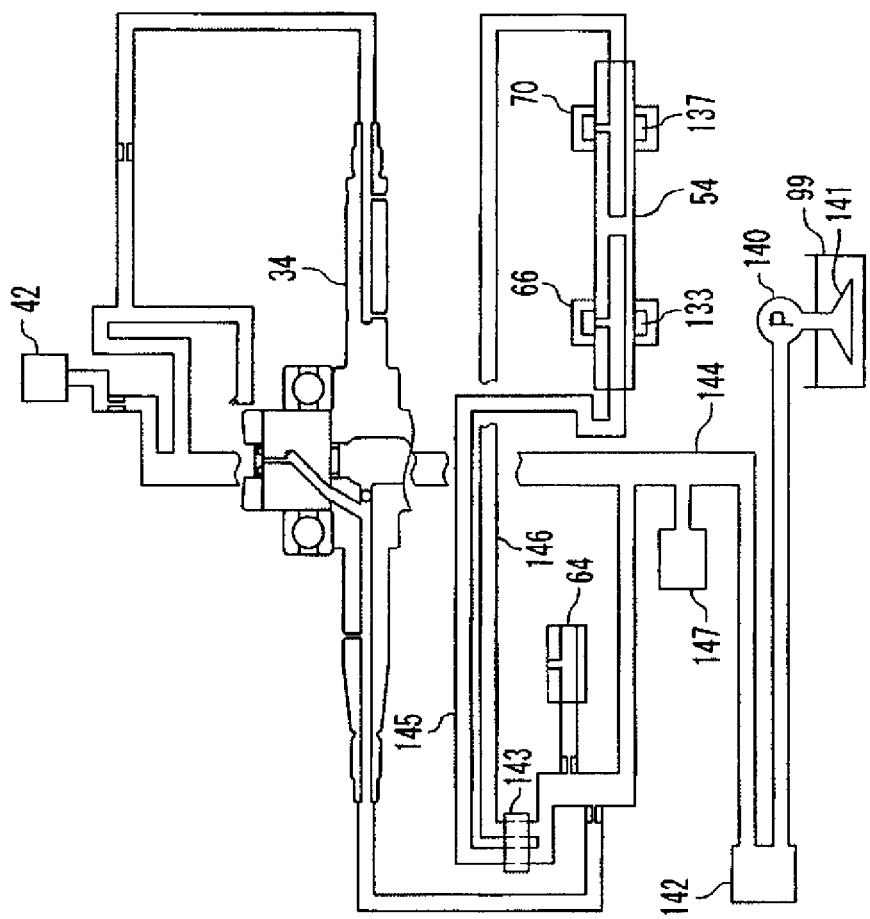
FIG. 8 is a conceptual diagram showing an oil circuit.

A cylinder body 37 is connected to a front side of the crankcase 32. A cylinder head 42 shown in FIG. 8 is connected to a tip end of the cylinder body 37. A cylinder 38 is defined in the cylinder body 37, and a piston 39 is accommodated in the cylinder 38.

Figure 4:
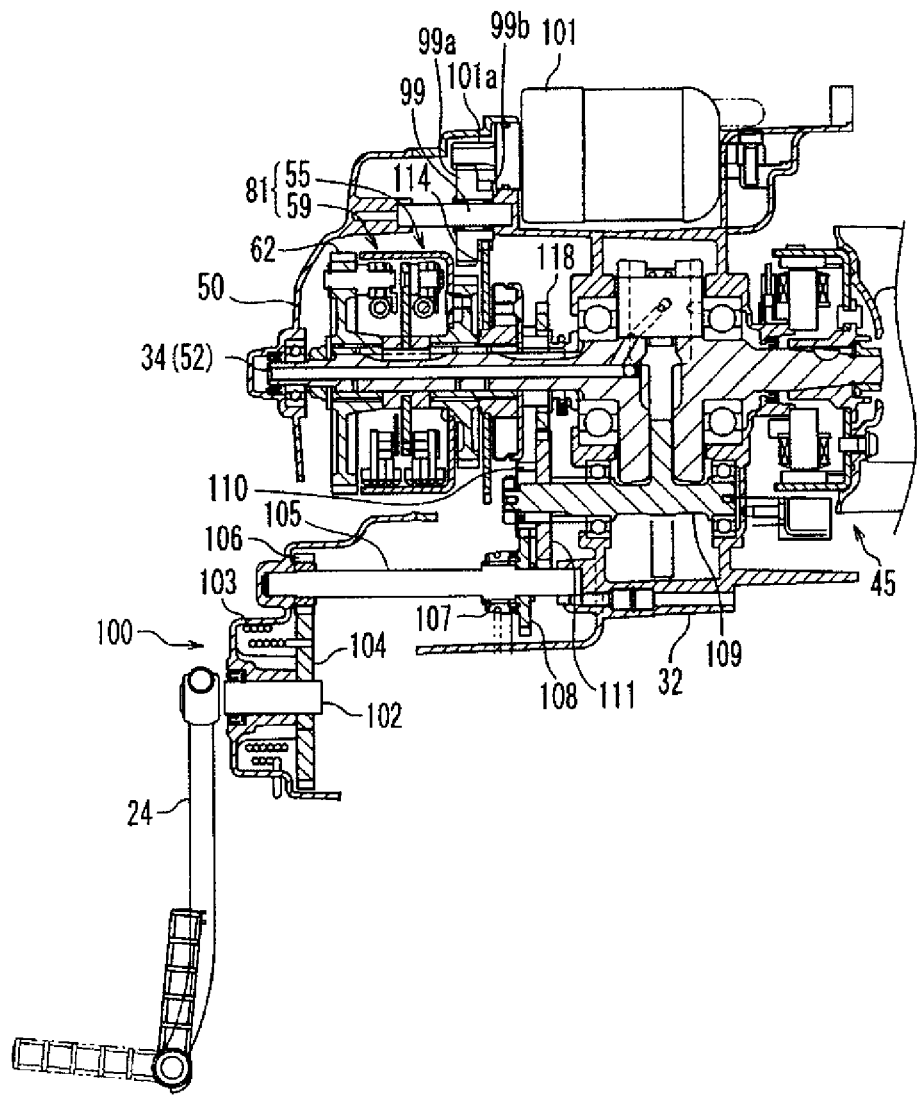
FIG. 4 is a partial sectional view of the engine unit.
Figure 5:
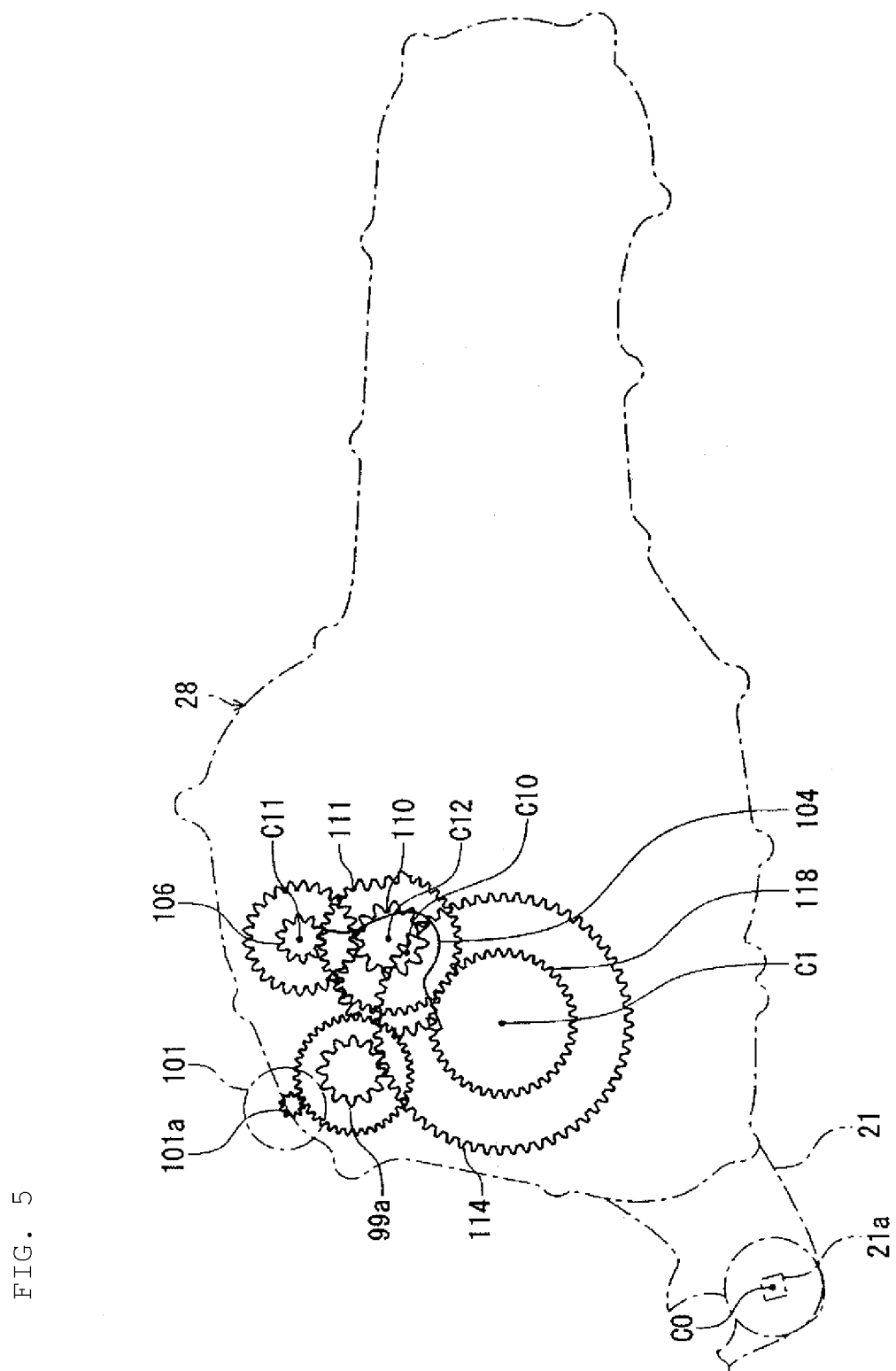
FIG. 5 is a schematic left side view showing the layout of the shafts of the engine unit.

As shown in FIGS. 1, 4 and 5, the engine 30 is preferably provided with a kick starter 100 and a cell motor 101. A rider of the motorcycle can start the engine 30 by operating the kick starter 100 or by driving the cell motor 101.

As shown in FIG. 4, the kick starter 100 includes a kick pedal 24. The kick pedal 24 is disposed on the right side of the transmission cover 50. The kick pedal 24 is mounted on a kick shaft 102 shown in FIG. 4. The kick shaft 102 is supported by the transmission cover 50. As shown in FIG. 5, an axial center C10 of the kick shaft 102 is disposed at a location rearward of and higher than the axial center C1 of the crankshaft 34.

A compression coil spring 103 is provided between the kick shaft 102 and the crankcase 32. To the kick shaft 102 which is rotated by a rider's operation, an urging force in the backward rotation direction is applied by the compression coil spring 103.

A shaft 105 is disposed at a location higher than the kick shaft 102. The shaft 105 is disposed from the transmission cover 50 to the crankcase 32 in the vehicle width direction. As shown in FIG. 5, an axial center C11 of the shaft 105 is disposed substantially above the axial center C10 of the kick shaft 102. The axial center C11 of the shaft 105 and the axial center C10 of the kick shaft 102 are disposed substantially at the same location in the longitudinal direction.

As shown in FIG. 4, a gear 106 is mounted on a left end portion of the shaft 105. The gear 106 is arranged to mesh with a gear 104 mounted on a right end portion of the kick shaft 102.

The shaft 105 is provided at its right end portion with a ratchet 107 and a gear 108. The ratchet 107 cannot rotate with respect to the shaft 105. The ratchet 107 can be displaced in the axial center direction of the shaft 105. The gear 108 can rotate with respect to the shaft 105.

The gear 108 is arranged to mesh with a gear 110 which is non-rotatably provided on a left end portion of a balancer shaft 109. A gear 111 is non-rotatably provided on the balancer shaft 109. The gear 111 is arranged to mesh with a gear 118 which is non-rotatably provided on the crankshaft 34.

With the kick pedal 24 being not operated, the ratchet 107 and the gear 108 do not mesh with each other. If the kick pedal 24 shown in FIG. 1 is operated by a rider, the shaft 105 rotates. As the shaft 105 rotates, the ratchet 107 is displaced rightward. With this, the ratchet 107 and the gear 108 mesh with each other. As a result, the rotation of the kick shaft 102 is transmitted to the gear 108. As a result, the rotation of the kick pedal 24 is transmitted to the crankshaft 34 through the shafts 102, 105 and 109, and the gears 104, 106, 107, 108, 110, 111 and 118.

As shown in FIG. 5, the cell motor 101 is disposed above and slightly forward of the axial center C1 of the crankshaft 34. As shown in FIG. 4, a gear 101a is provided on a rotation shaft of the cell motor 101. The gear 101a is arranged to mesh with a gear 99a which is non-rotatably provided on the shaft 99. A gear 99b is non-rotatably provided on the shaft 99. The gear 99b is arranged to mesh with a gear 114 which is non-rotatably provided on the crankshaft 34. Therefore, rotation of the cell motor 101 is transmitted to the crankshaft 34 through the gears 101a, 99a, 99b, 114 and the shaft 99.

As shown in FIG. 2, a power generator 45 is mounted on a left end portion of the crankshaft 34. The power generator 45 includes an inner member 45a and an outer member 45b. The inner member 45a is non-rotatable with respect to the crankcase 32. The outer member 45b is mounted on the left end portion of the crankshaft 34. The outer member 45b rotates together with the crankshaft 34. Thus, if the crankshaft 34 rotates, the outer member 45b rotates relative to the inner member 45a. As a result, electricity is generated.

The transmission cover 50 is mounted on the left side of the crankcase 32. A transmission chamber 51 is defined by the transmission cover 50 and the crankcase 32.

The stepwise automatic transmission 31 is disposed in the transmission chamber 51. The stepwise automatic transmission 31 preferably is a four-speed stepwise automatic transmission. More specifically, the stepwise automatic transmission 31 preferably is a so-called gear train type stepwise automatic transmission by which power is transmitted from the input shaft 52 to the output shaft 33 through a plurality of pairs of transmissions.

In this preferred embodiment, the input shaft 52 of the stepwise automatic transmission 31 and the crankshaft 34 are preferably constituted by the same rotation shaft. However, the present invention is not limited to this structure. For example, the input shaft 52 of the stepwise automatic transmission 31 and the crankshaft 34 may be constituted by different rotation shafts. In this case, the input shaft 52 and the crankshaft 34 may be disposed on the same shaft or on different shafts.

The stepwise automatic transmission 31 preferably includes a first rotation shaft 53, a second rotation shaft 54, a third rotation shaft 64, a fourth rotation shaft 40 and a fifth rotation shaft 41, and these five shafts are preferably provided on a power transmission path between the input shaft 52 and the output shaft 33. The input shaft 52, the first rotation shaft 53, the second rotation shaft 54, the third rotation shaft 64, the fourth rotation shaft 40, the fifth rotation shaft 41 and the output shaft 33 are disposed substantially in parallel to each other.

As shown in FIG. 3, an axial center C2 of the first rotation shaft 53 is located rearward of the axial center C1 of the input shaft 52. The axial center C2 of the first rotation shaft 53 is located lower than the axial center C1 of the input shaft 52. The axial center C2 of the first rotation shaft 53 is located slightly lower than a plane P including the axial center C1 of the input shaft 52 and an axial center C7 of the output shaft 33.

An axial center C3 of the second rotation shaft 54 is located rearward of the axial center C1 of the input shaft 52 and the axial center C2 of the first rotation shaft 53, respectively. The axial center C3 of the second rotation shaft 54 is located higher than the axial center C1 of the input shaft 52 and the axial center C2 of the first rotation shaft 53. The axial center C3 of the second rotation shaft 54 is located higher than the plane P.

An axial center C4 of the third rotation shaft 64 is located rearward of the axial center C1 of the input shaft 52, the axial center C2 of the first rotation shaft 53 and the axial center C3 of the second rotation shaft 54, respectively. The axial center C4 of the third rotation shaft 64 is located slightly higher than the axial center C1 of the input shaft 52 and the axial center C2 of the first rotation shaft 53, respectively. The axial center C4 of the third rotation shaft 64 is located lower than the axial center C3 of the second rotation shaft 54. The axial center C4 of the third rotation shaft 64 is located higher than the plane P.

An axial center C5 of the fourth rotation shaft 40 is located rearward of the axial center C1 of the input shaft 52, the axial center C2 of the first rotation shaft 53 and the axial center C3 of the second rotation shaft 54, respectively. The axial center C5 of the fourth rotation shaft 40 is located slightly higher than the axial center C1 of the input shaft 52 and the axial center C2 of the first rotation shaft 53, respectively. The axial center C5 of the fourth rotation shaft 40 is located lower than the axial center C3 of the second rotation shaft 54. The axial center C5 of the fourth rotation shaft 40 is located substantially at the same height as the axial center C4 of the third rotation shaft 64. The axial center C5 of the fourth rotation shaft 40 is located higher than the plane P.

An axial center C6 of the fifth rotation shaft 41 is located rearward of the axial center C1 of the input shaft 52, the axial center C2 of the first rotation shaft 53, the axial center C3 of the second rotation shaft 54, the axial center C4 of the third rotation shaft and the axial center C5 of the fourth rotation shaft 40, respectively. The axial center C6 of the fifth rotation shaft 41 is located slightly higher than the axial center C1 of the input shaft 52 and the axial center C2 of the first rotation shaft 53, respectively. The axial center C6 of the fifth rotation shaft 41 is located lower than the axial center C3 of the second rotation shaft 54, the axial center C4 of the third rotation shaft 64 and the axial center C5 of the fourth rotation shaft 40. The axial center C6 of the fifth rotation shaft 41 is located higher than the plane P.

FIG. 6 shows a gear structure of the stepwise automatic transmission 31. FIG. 6 schematically shows the gear structure of the stepwise automatic transmission 31. Therefore, sizes of the gears and clutches shown in FIG. 6 are different from the actual sizes.

As shown in FIGS. 6 and 2, the input shaft 52 is provided with an upstream clutch group 81. The upstream clutch group 81 includes a first clutch 55 and a third clutch 59. The first clutch 55 is disposed on the right side of the third clutch 59.

The first clutch 55 and the third clutch 59 preferably are respectively configured by centrifugal clutches, but the present invention is not limited to this structure. The first clutch 55 and the third clutch 59 may be clutches other than the centrifugal clutches. For example, the first clutch 55 and the third clutch 59 may be hydraulic clutches. However, it is preferable that the first clutch 55 is the centrifugal clutch.

More specifically, in this preferred embodiment, the first clutch 55 and the third clutch 59 preferably are respectively configured by drum type centrifugal clutches. However, the first clutch 55 and the third clutch 59 may be respectively configured by multi-plate clutches.

The first clutch 55 includes an inner member 56 as an input-side clutch member and an outer member 57 as an output-side clutch member. The inner member 56 cannot rotate relative to the input shaft 52. Thus, the inner member 56 rotates together with the input shaft 52. The outer member 57, on the other hand, can rotate relative to the input shaft 52. If the rotation speed of the input shaft 52 exceeds a predetermined rotation speed, the inner member 56 and the outer member 57 come into contact with each other due to application of a centrifugal force acting on the inner member 56. As a result, the first clutch 55 is brought into a connected state. In the case that the inner member 56 and the outer member 57 rotate in their connected state, if the rotation speed becomes smaller than the predetermined rotation speed, the centrifugal force acting on the inner member 56 becomes weak and the inner member 56 and the outer member 57 are separated from each other. With this, the first clutch 55 is disconnected.

A first gear 58 is provided on the outer member 57 of the first clutch 55 such that the first gear 58 cannot rotate relative to the outer member 57. The first gear 58 rotates together with the outer member 57 of the first clutch 55. A second gear 63 is provided on the first rotation shaft 53. The second gear 63 meshes with the first gear 58. The first gear 58 and the second gear 63 constitute a pair of first transmissions 86. In this preferred embodiment, the pair of first transmissions 86 constitutes a pair of first-speed transmissions.

The second gear 63 preferably is a so-called one-way gear. More specifically, the second gear 63 transmits rotation of the first gear 58 to the first rotation shaft 53. The second gear 63 does not transmit rotation of the first rotation shaft 53. More specifically, the second gear 63 also functions as a one-way rotation transmitting mechanism 96.

The third clutch 59 includes an inner member 60 as an output-side clutch member, and an outer member 61 as an input-side clutch member.

The inner member 60 of the third clutch 59 as the output-side clutch member is provided with a ninth gear 62. The ninth gear 62 rotates together with the inner member 60. The first rotation shaft 53 is provided with a tenth gear 65. The tenth gear 65 is arranged to mesh with the ninth gear 62. The tenth gear 65 and the ninth gear 62 constitute a pair of third transmissions 83. The pair of third transmissions 83 has a gear ratio different from that of the pair of first transmissions 86. More specifically, the pair of third transmissions 83 has the gear ratio smaller than that of the pair of first transmissions 86. The pair of third transmissions 83 constitutes a pair of second-speed transmissions.

The inner member 60 is arranged such that it cannot rotate relative to the ninth gear 62 as described above. If the input shaft 52 rotates, this rotation is transmitted to the inner member 60 through the pair of first transmissions 86, the first rotation shaft 53 and the pair of third transmissions 83. Therefore, the inner member 60 rotates together with the input shaft 52. The outer member 61 can rotate relative to the input shaft 52. If the rotation speed of the input shaft 52 exceeds a predetermined rotation speed, the inner member 60 and the outer member 61 come into contact with each other due to a centrifugal force acting on the inner member 60. As a result, the third clutch 59 is brought into the connected state. In the case in which the inner member 60 and the outer member 61 rotate in their connected state, if the rotation speed becomes smaller than the predetermined rotation speed, the centrifugal force acting on the inner member 60 becomes weak and the inner member 60 and the outer member 61 are separated from each other. With this, the third clutch 59 is disconnected.

The outer member 57 and the outer member 61 preferably are constituted by the same member in this preferred embodiment, but the present invention is not limited to this structure. The outer member 57 and the outer member 61 may be constituted by different members.

The rotation speed of the input shaft 52 when the first clutch 55 is connected to the input shaft 52 is different from the rotation speed of the input shaft 52 when the third clutch 59 is connected to the input shaft 52. More specifically, the rotation speed of the input shaft 52 when the first clutch 55 is connected to the input shaft 52 is smaller than the rotation speed of the input shaft 52 when the third clutch 59 is connected to the input shaft 52. This will be described more specifically. The first clutch 55 is brought into the connected state when the rotation speed of the input shaft 52 is equal to or higher than the first rotation speed. If the rotation speed of the input shaft 52 is less than the first rotation speed, the first clutch 55 is brought into the disconnected state. The third clutch 59 is brought into the connected state when the rotation speed of the input shaft 52 is equal to or higher than the second rotation speed which is higher than the first rotation speed. On the other hand, the third clutch 59 is brought into the disconnected state when the rotation speed of the input shaft 52 is less than the second rotation speed.

As shown in FIG. 2, the first clutch 55 and the third clutch 59 are located between the pair of first transmissions 86 and the pair of third transmissions 83 in the vehicle width direction.

In this preferred embodiment, the tenth gear 65 also functions as a third gear 87. A second rotation shaft 54 is provided with a fourth gear 75 which cannot rotate relative to the second rotation shaft 54. The fourth gear 75 rotates together with the second rotation shaft 54. The third gear 87 which also functions as the tenth gear 65 is arranged to mesh with the fourth gear 75. The third gear 87 which also functions as the tenth gear 65 and the fourth gear 75 constitute a pair of first transmission gears 84. The pair of first transmission gears 84, the pair of first transmissions 86 and the pair of third transmissions 83 constitute a first power transmission mechanism 26. The rotation of the input shaft 52 is transmitted to the second rotation shaft 54 by the first power transmission mechanism 26.

The second rotation shaft 54 is provided with a fifth gear 74 which cannot rotate relative to the second rotation shaft 54. The fifth gear 74 rotates together with the second rotation shaft 54. The third rotation shaft 64 is provided with a sixth gear 78 which cannot rotate relative to the third rotation shaft 64. The third rotation shaft 64 rotates together with the sixth gear 78. The fifth gear 74 and the sixth gear 78 are arranged to mesh with each other. The fifth gear 74 and the sixth gear 78 constitute a pair of second transmission gears 85.

The sixth gear 78 preferably is a so-called one-way gear. More specifically, the sixth gear 78 transmits rotation of the second rotation shaft 54 to the third rotation shaft 64. The sixth gear 78, on the other hand, does not transmit the rotation of the third rotation shaft 64 to the second rotation shaft 54. More specifically, the sixth gear 78 includes a one-way rotation transmitting mechanism 93.

In the present invention, it is not absolutely necessary that the sixth gear 78 is the so-called one-way gear. For example, the sixth gear 78 may be a normal gear and the fifth gear 74 may be the so-called one-way gear. In other words, the fifth gear 74 may also function as the one-way rotation transmitting mechanism. More specifically, the fifth gear 74 may transmit the rotation of the second rotation shaft 54 to the sixth gear 78, and may transmit the rotation of the sixth gear 78 to the second rotation shaft 54.

The second rotation shaft 54 is provided with a downstream clutch group 82. The downstream clutch group 82 is located rearward of the upstream clutch group 81. The downstream clutch group 82 and the upstream clutch group 81 are disposed at such locations that they overlap each other at least partially in the axial direction of the input shaft 52. Specifically, the downstream clutch group 82 and the upstream clutch group 81 are disposed at such locations that they substantially overlap each other in the vehicle width direction.

As shown in FIG. 3, a front end 70b of a second clutch 70 is located forward of a rear end 55a of the first clutch 55 as viewed from the axial center direction of the input shaft 52 in a direction perpendicular or substantially perpendicular to the axis center of the input shaft 52 on a plane including the axis center of the input shaft 52 and the axis center of the output shaft 33. In this preferred embodiment, in a state where the motorcycle 1 is at rest, the front end of the downstream clutch group 82 is located forward of the rear end of the upstream clutch group 81 as viewed from the axial center direction of the input shaft 52.

As shown in FIG. 6, the downstream clutch group 82 includes the second clutch 70 and a fourth clutch 66. The fourth clutch 66 is disposed on the right side of the second clutch 70. Thus, a direction in which the first clutch 55 is located with respect to the third clutch 59 and a direction in which the fourth clutch 66 is located with respect to the second clutch 70 are the same. The first clutch 55 and the fourth clutch 66 are disposed such that they overlap each other at least partially in the vehicle width direction. The third clutch 59 and the second clutch 70 are disposed such that they overlap each other at least partially in the vehicle width direction. More specifically, the first clutch 55 and the fourth clutch 66 are disposed such that they substantially overlap each other in the vehicle width direction. The third clutch 59 and the second clutch 70 are disposed such that they substantially overlap each other in the vehicle width direction.

The second clutch 70 and the fourth clutch 66 preferably are so-called hydraulic clutches. Specifically, in this preferred embodiment, the second clutch 70 and the fourth clutch 66 preferably are multi-plate hydraulic clutches. However, the present invention is not limited to this structure. The fourth clutch 66 and the second clutch 70 may be clutches other than the hydraulic clutches. For example, the fourth clutch 66 and the second clutch 70 may be centrifugal clutches. However, it is preferable that the fourth clutch 66 and the second clutch 70 are hydraulic clutches.

The rotation speed of the second rotation shaft 54 when the second clutch 70 is connected to the second rotation shaft 54 is different from the rotation speed of the second rotation shaft 54 when the fourth clutch 66 is connected to the second rotation shaft 54. In this preferred embodiment, the rotation speed of the second rotation shaft 54 when the second clutch 70 is connected to the second rotation shaft 54 is lower than the rotation speed of the second rotation shaft 54 when the fourth clutch 66 is connected to the second rotation shaft 54.

The second clutch 70 includes an inner member 71 as an input-side clutch member and an outer member 72 as an output-side clutch member. The inner member 71 is arranged such that it cannot rotate relative to the second rotation shaft 54. Thus, the inner member 71 rotates together with the second rotation shaft 54. The outer member 72, on the other hand, can rotate relative to the second rotation shaft 54. In a state where the second clutch 70 is not connected, if the second rotation shaft 54 rotates, the inner member 71 rotates together with the second rotation shaft 54, but the outer member 72 does not rotate together with the second rotation shaft 54. In a state where the second clutch 70 is connected, both the inner member 71 and the outer member 72 rotate together with the second rotation shaft 54.

A seventh gear 73 is mounted on the outer member 72 as the output-side clutch member of the second clutch 70. The seventh gear 73 rotates together with the outer member 72. The third rotation shaft 64 is provided with an eighth gear 77 which cannot rotate relative to the third rotation shaft 64. The eighth gear 77 rotates together with the third rotation shaft 64. The seventh gear 73 and the eighth gear 77 are arranged to mesh with each other. Thus, the rotation of the outer member 72 is transmitted to the third rotation shaft 64 through the seventh gear 73 and the eighth gear 77.

The seventh gear 73 and the eighth gear 77 constitute a pair of second transmissions 91. The pair of second transmissions 91 has a gear ratio which is different from the gear ratio of the pair of first transmissions 86, the gear ratio of the pair of third transmissions 83 and the gear ratio of the pair of fourth transmissions 90.

The pair of second transmissions 91 is located on the same side of the second clutch 70 where the pair of third transmissions 83 is located with respect to the third clutch 59. More specifically, the pair of second transmissions 91 is located on the left side of the second clutch 70. The pair of third transmissions 83 is also located on the left side of the third clutch 59.

The pair of second transmissions 91 and the pair of third transmissions 83 are disposed such that they overlap each other at least partially in the vehicle width direction. More specifically, the pair of second transmissions 91 and the pair of third transmissions 83 are disposed such that they substantially overlap each other in the vehicle width direction.

The fourth clutch 66 includes an inner member 67 as an input-side clutch member and an outer member 68 as an output-side clutch member. The inner member 67 is arranged such that it cannot rotate relative to the second rotation shaft 54. Thus, the inner member 67 rotates together with the second rotation shaft 54. The outer member 68, on the other hand, can rotate relative to the second rotation shaft 54. In a state where the fourth clutch 66 is not connected, if the second rotation shaft 54 rotates, the inner member 67 rotates together with the second rotation shaft 54, but the outer member 68 does not rotate together with the second rotation shaft 54. In a state where the fourth clutch 66 is connected, both the inner member 67 and outer member 68 rotate together with the second rotation shaft 54.

An eleventh gear 69 is mounted on the outer member 68 of the fourth clutch 66 as the output-side clutch member. The eleventh gear 69 rotates together with the outer member 68. The third rotation shaft 64, on the other hand, is provided with a twelfth gear 76 which cannot rotate relative to the third rotation shaft 64. The twelfth gear 76 rotates together with the third rotation shaft 64. The eleventh gear 69 and the twelfth gear 76 are arranged to mesh with each other. Therefore, the rotation of the outer member 68 is transmitted to the third rotation shaft 64 through the eleventh gear 69 and the twelfth gear 76.

The twelfth gear 76 and the eleventh gear 69 constitute the pair of fourth transmissions 90. The pair of fourth transmissions 90 has a gear ratio which is different from the gear ratio of the pair of first transmissions 86 and the gear ratio of the pair of third transmissions 83.

The second clutch 70 and the fourth clutch 66 are located between the pair of second transmissions 91 and the pair of fourth transmissions 90 in the vehicle width direction.

The pair of fourth transmissions 90 is located on the same side on the fourth clutch 66 where the pair of first transmissions 86 is located with respect to the first clutch 55. More specifically, the pair of fourth transmissions 90 is located on the right side of the fourth clutch 66. The pair of first transmissions 86 is also located on the right side of the first clutch 55.

The pair of fourth transmissions 90 and the pair of first transmissions 86 are disposed such that they overlap each other at least partially in the vehicle width direction. In other words, the pair of fourth transmissions 90 and the pair of first transmissions 86 are disposed such that they overlap each other at least partially in the axial direction of the input shaft 52. More specifically, the pair of fourth transmissions 90 and the pair of first transmissions 86 substantially overlap each other in the vehicle width direction.

The third rotation shaft 64 is provided with a thirteenth gear 79 which cannot rotate relative to the third rotation shaft 64. The thirteenth gear 79 rotates together with the third rotation shaft 64. The fourth rotation shaft 40 is provided with a fourth rotation shaft 40 which cannot rotate relative to the fourth rotation shaft 40. The fourteenth gear 80 and the thirteenth gear 79 constitute a pair of third transmission gears 98.

The fourth rotation shaft 40 is provided with a fifteenth gear 115 such that the fifteenth gear 115 cannot rotate. Through a sixteenth gear 116 which is non-rotatably provided on the fifth rotation shaft 41, the fifteenth gear 115 is arranged to mesh with a seventeenth gear 117 which is non-rotatably provided on the output shaft 33. The fifteenth gear 115, the sixteenth gear 116 and the seventeenth gear 117 constitute a pair of fourth transmission gears 120. Rotation of the fourth rotation shaft 40 is transmitted to the output shaft 33 through the pair of fourth transmission gears 120. The pair of fourth transmission gears 120, the pair of fourth transmissions 90, the pair of second transmissions 91, the pair of third transmission gears 98 and the pair of second transmission gears 85 constitute a second power transmission mechanism 27. Rotation of the second rotation shaft 54 is transmitted to the output shaft 33 through the second power transmission mechanism 27.

Next, the downstream clutch group 82 will be described in more detail mainly with reference to FIG. 7.

The second clutch 70 is provided with a group of plates 136. The group of plates 136 includes a plurality of friction plates 134 and a plurality of clutch plates 135. The plurality of friction plates 134 and the plurality of clutch plates 135 are alternately disposed in the vehicle width direction. The friction plates 134 cannot rotate relative to the outer member 72. The clutch plates 135, on the other hand, cannot rotate relative to the inner member 71.

The inner member 71 can rotate relative to the outer member 72. A pressure plate 163 is disposed on the inner member 71 on the opposite side from the outer member 72 in the vehicle width direction. The pressure plate 163 is urged rightward in the vehicle width direction by a compression coil spring 92. That is, the pressure plate 163 is urged toward a boss 162 by the compression coil spring 92.

An operation chamber 137 is defined between the boss 162 and the pressure plate 163. The operation chamber 137 is filled with oil. If a hydraulic pressure in the operation chamber 137 becomes high, the pressure plate 163 is displaced in a direction separating away from the boss 162. With this, a distance between the pressure plate 163 and the inner member 71 becomes short. Therefore, the group of plates 136 is brought into contact with each other under pressure. As a result, the inner member 71 and the outer member 72 rotate together, and the second clutch 70 is brought into the connected state.

If, on the other hand, the pressure in the operation chamber 137 is lowered, the pressure plate 163 is displaced toward the boss 162 by the compression coil spring 92. With this, the pressure contact state among the group of plates 136 is released. As a result, both the inner member 71 and the outer member 72 can rotate relative to each other, and the second clutch 70 is disconnected.

The fourth clutch 66 includes a group of plates 132. The group of plates 132 includes a plurality of friction plates 130 and a plurality of clutch plates 131. The plurality of friction plates 130 and the plurality of clutch plates 131 are alternately disposed in the vehicle width direction. The plurality of friction plates 130 cannot rotate relative to the outer member 68. The clutch plates 131, on the other hand, cannot rotate relative to the inner member 67.

The inner member 67 can rotate relative to the outer member 68 and can be displaced in the vehicle width direction. A pressure plate 161 is disposed on the inner member 67 on the opposite side from the outer member 68 in the vehicle width direction. The pressure plate 161 is urged leftward in the vehicle width direction by a compression coil spring 89. That is, the pressure plate 161 is urged toward the boss 162 by the compression coil spring 89.

An operation chamber 133 is defined between the boss 162 and the pressure plate 161. The operation chamber 133 is filled with oil. If a hydraulic pressure in the operation chamber 133 becomes high, the pressure plate 161 is displaced in a direction separating away from the boss 162. With this, a distance between the pressure plate 161 and the inner member 67 becomes short. Therefore, the group of plates 132 is brought into contact with each other under pressure. As a result, the inner member 67 and the outer member 68 rotate together, and the fourth clutch 66 is brought into the connected state.

If, on the other hand, the pressure in the operation chamber 133 is lowered, the pressure plate 161 is displaced toward the boss 162 by the compression coil spring 89. With this, the pressure contact state among the group of plates 132 is released. As a result, the inner member 67 and the outer member 68 can rotate relative to each other, and the fourth clutch 66 is disconnected.

Fine leak holes 70a and 66a which are in communication with the operation chambers 133 and 137 are formed in the second clutch 70 and the fourth clutch 66, respectively. Gaps between the inner members 71 and 67 and the outer members 72 and 68 in the second clutch 70 and the fourth clutch 66, respectively, are not sealed. Therefore, when the clutches 70 and 66 are disconnected, oil in the operation chambers 133 and 137 can be discharged swiftly. Therefore, according to this preferred embodiment, responsiveness of the clutches 70 and 66 can be enhanced. Oil which is scattered from gaps between the leak holes 70a and 66a and the inner member 71 and the outer member 72 provides lubrication of other sliding portions.

As shown in FIG. 8, oil stored in an oil reservoir 99 provided in a bottom of the crank chamber 35 is supplied to the operation chamber 133 of the fourth clutch 66 and to the operation chamber 137 of the second clutch 70 via an oil pump 140.

A strainer 141 is put into the oil reservoir 99. The strainer 141 is connected to the oil pump 140. By operating the oil pump 140, oil stored in the oil reservoir 99 is sucked up through the strainer 141.

A first oil path 144 is connected to the oil pump 140. An oil cleaner 142 and a relief valve 147 are provided on the first oil path 144. The sucked up oil is cleaned by the oil cleaner 142. The relief valve 147 prevents a pressure in the first oil path 144 from exceeding a predetermined pressure.

The first oil path 144 is connected to the crankshaft 34 and the cylinder head 42. Oil from the oil pump 140 is supplied to the crankshaft 34 and sliding portions in the cylinder head 42 through the first oil path 144.

The first oil path 144 is connected to a second oil path 145 and to a third oil path 146. As shown in FIG. 7, the second oil path 145 is connected to a right end portion of the second rotation shaft 54 from a valve 143 through the side of the crankcase 32 shown in FIG. 2. The second oil path 145 extends from the right end portion of the second rotation shaft 54 to the operation chamber 133 through the inside of the second rotation shaft 54. Therefore, oil from the oil pump 140 is supplied to the operation chamber 133 of the fourth clutch 66 through the first oil path 144 and the second oil path 145.

The third oil path 146 is connected to a left end portion of the second rotation shaft 54 from the valve 143 through the side of the transmission cover 50. The third oil path 146 extends from the left end portion of the second rotation shaft 54 to the operation chamber 137 through the inside of the second rotation shaft 54. Therefore, oil from the oil pump 140 is supplied to the operation chamber 137 of the second clutch 70 through the first oil path 144 and the third oil path 146.

As described above, in the motorcycle 1, lubricating of the engine unit 20 is also used as operating oil of the second and fourth clutches 70 and 66.

The second oil path 145 and the third oil path 146 are connected to and disconnected from the first oil path 144 via the valve 143. As shown in FIG. 7, a motor 150 is mounted on the valve 143. The valve 143 is operated by the motor 150. With this, second oil path 145 and the third oil path 146 are connected to and disconnected from the first oil path 144. As a result, the second clutch 70 and the fourth clutch 66 are connected to and disconnected from each other.

The valve 143 includes an outer member 143a and an inner member 143b constituted by the transmission cover 50. A columnar recess portion 143c is formed in the outer member 143a. The recess portion 143c opens toward the outside of the stepwise automatic transmission 31. The first oil path 144 as an operating oil supply path, and the second and the third oil paths 145 and 146 as operating oil discharge paths respectively open into an inner peripheral surface of the recess 143c.

The inner member 143b preferably has a substantially columnar shape. The inner member 143b is rotatably inserted into the recess portion 143c. Communication paths 148 and 149 are formed in the inner member 143b. The communication path 148 and the communication path 149 are disposed at different positions in the axial direction of the inner member 143b. The communication path 148 and the communication path 149 are formed independently of each other. That is, the communication path 148 and the communication path 149 are not in communication with each other.

Both end portions of the communication paths 148 and 149 open into an outer peripheral surface of the inner member 143b. The communication path 148 brings the first oil path 144 and the second oil path 145 into communication with each other. When the inner member 143b is located at a second communication angle with respect to the outer member 143a, the communication path 148 brings the first oil path 144 and the second oil path 145 into communication with each other. The communication path 149 brings the first oil path 144 and the third oil path 146 into communication with each other. When the inner member 143b is located at a first communication angle with respect to the outer member 143a, the communication path 149 brings the first oil path 144 and the third oil path 146 into communication with each other. In this preferred embodiment, the first communication angle and the second communication angle preferably are different from each other.

The motor 150 as a drive mechanism is connected to the inner member 143b. The motor 150 arbitrarily controls the rotation angle of the inner member 143b with respect to the outer member 143a. The ECU 138 as a control device is connected to the motor 150. A vehicle speed sensor 88, a throttle position sensor 112 and a memory 113 are connected to the ECU 138. The throttle position sensor 112 detects a throttle position. The vehicle speed sensor 88 detects a vehicle speed. The inner member 143b is provided with a potentiometer (not shown). An angle of the inner member 143b is detected by the potentiometer. The potentiometer is also connected to the ECU 138.

The ECU 138 controls the motor 150 based on at least one of the throttle position and the vehicle speed. In this preferred embodiment, the ECU 138 controls the motor 150 based on both the throttle position and the vehicle speed. More specifically, the ECU 138 applies the throttle position and the vehicle speed to a V-N diagram which is read from the memory 113, thereby calculating a target angle of the inner member 143b. The ECU 138 controls the motor 150 based on the calculated target angle and the current angle of the inner member 143b detected by the potentiometer.

When the motor 150 is driven by the ECU 138 and the inner member 143b assumes the second communication angle with respect to the outer member 143a, the first oil path 144 and the second oil path 145 are brought into communication with each other. As a result, the fourth clutch 66 is brought into the connected state. The first oil path 144 and the third oil path 146 are not in communication with each other. Thus, the second clutch 70 is in the disconnected state.

If the inner member 143b assumes the first communication angle with respect to the outer member 143a, the first oil path 144 and the third oil path 146 are brought into communication with each other. As a result, the second clutch 70 is brought into the connected state. The first oil path 144 and the second oil path 145 are not in communication with each other. Thus, the fourth clutch 66 is brought into the disconnected state.

If the inner member 143b assumes an angle which is not the first communication angle or second communication angle with respect to the outer member 143a, the second oil path 145 and the third oil path 146 are disconnected from the first oil path 144. Thus, the second clutch 70 and the fourth clutch 66 are brought into the disconnected states.

Next, the operation of the stepwise automatic transmission 31 will be described in detail with reference to FIGS. 9 to 12.

Figure 9:
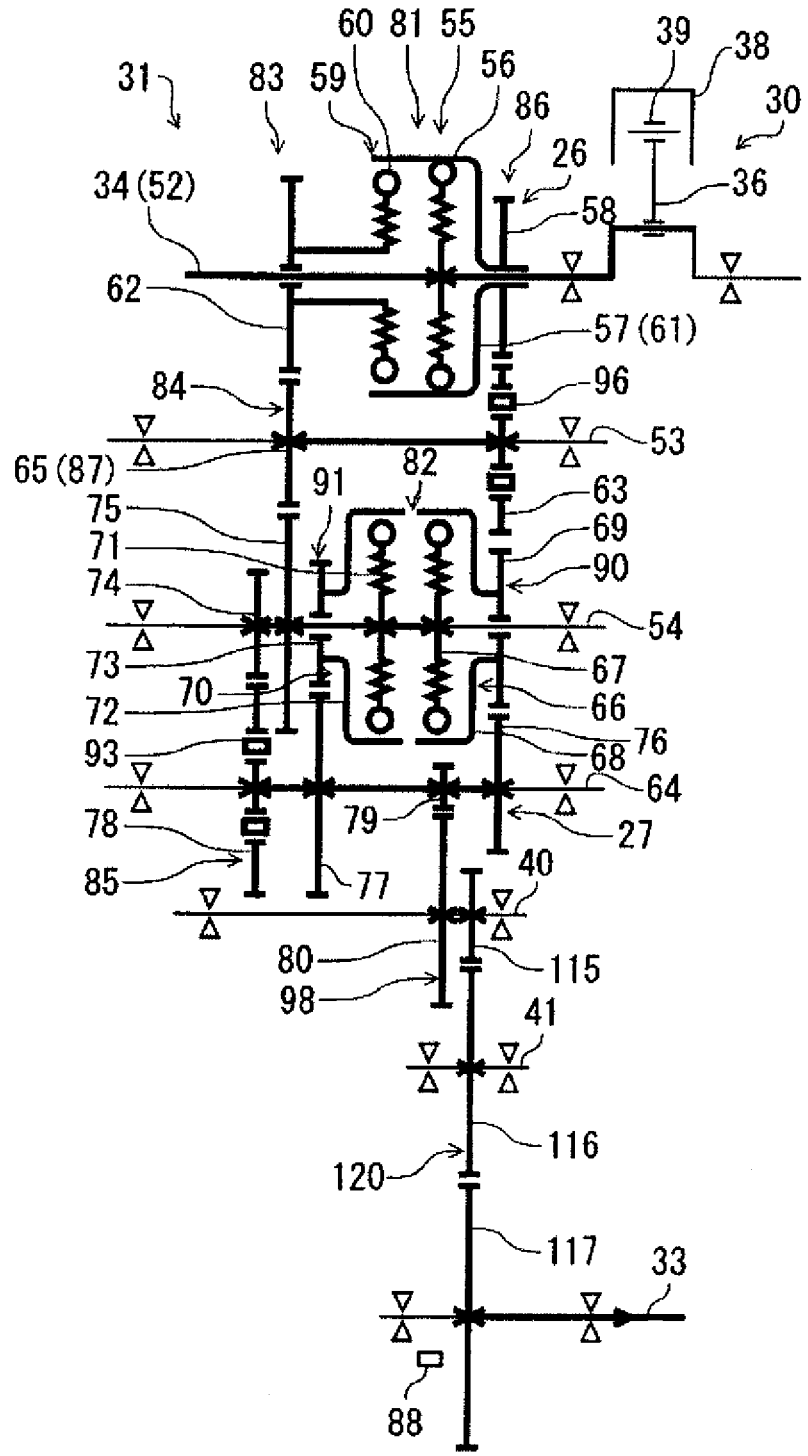
FIG. 9 is a schematic diagram for explaining a power transmission path at the time of the first speed in the transmission.

If the engine 30 is started, the crankshaft 34 which that is preferably integral with the input shaft 52 starts rotating. The inner member 56 of the first clutch 55 rotates together with the input shaft 52. Thus, if the rotation speed of the input shaft 52 becomes equal to or higher than a predetermined first rotation speed, the first clutch 55 is brought into the connected state as shown in FIG. 9. If the first clutch 55 is brought into the connected state, the pair of first transmissions 86 rotate together with the outer member 57 of the first clutch 55. With this, rotation of the input shaft 52 is transmitted to the first rotation shaft 53.

The third gear 87 rotates together with the first rotation shaft 53. Thus, as the first rotation shaft 53 rotates, the pair of first transmission gears 84 also rotate. Therefore, rotation of the first rotation shaft 53 is transmitted to the second rotation shaft 54 through the pair of first transmission gears 84.

The fifth gear 74 rotates together with the second rotation shaft 54. Therefore, as the second rotation shaft 54 rotates, the pair of second transmission gears 85 also rotates. The rotation of the second rotation shaft 54 is transmitted to the third rotation shaft 64 through the pair of second transmission gears 85.

The thirteenth gear 79 rotates together with the third rotation shaft 64. Thus, as the third rotation shaft 64 rotates, the pair of third transmission gears 98 also rotates. Rotation of the third rotation shaft 64 is transmitted to the fourth rotation shaft 40 through the pair of third transmission gears 98.

The fifteenth gear 115 rotates together with the fourth rotation shaft 40. Thus, as the fourth rotation shaft 40 rotates, the pair of fourth transmission gears 120 also rotates. Rotation of the fourth rotation shaft 40 is transmitted to the output shaft 33 through the pair of fourth transmission gears 120.

When the motorcycle 1 is started, i.e., at the time of the first speed, as shown in FIG. 9, rotation is transmitted from the input shaft 52 to the output shaft 33 through the first clutch 55, the pair of first transmissions 86, the pair of first transmission gears 84, the pair of second transmission gears 85, the pair of third transmission gears 98 and the pair of fourth transmission gears 120.

The tenth gear 65 rotates together with the first rotation shaft 53. Thus, at the time of the first speed, the pair of third transmissions 83 and the inner member 60 of the third clutch 59 rotate together. However, at the time of the first speed, the third clutch 59 is in the disconnected state. Therefore, rotation of the input shaft 52 is not transmitted to the first rotation shaft 53 through the pair of third transmissions 83.

The eighth gear 77 and the twelfth gear 76 rotate together with the third rotation shaft 64. Thus, at the time of the first speed, the pair of second transmissions 91 and the pair of fourth transmissions 90 rotate together. However, at the time of the first speed, the second clutch 70 and the fourth clutch 66 are in the disconnected states. Thus, rotation of the second rotation shaft 54 is not transmitted to the third rotation shaft 64 through the pair of second transmissions 91 and the pair of fourth transmissions 90.

At the time of the first speed, the tenth gear 65 which is preferably in common with the third gear 87 rotates together with the first rotation shaft 53. The ninth gear 62 which meshes with the tenth gear 65 and the inner member 60 of the third clutch 59 rotates together. Thus, if the rotation speed of the input shaft 52 becomes high, the rotation speed of the inner member 60 of the third clutch 59 also becomes high. If the rotation speed of the input shaft 52 becomes equal to or higher than a second rotation speed which is faster than the first rotation speed, the rotation speed of the inner member 60 is increased correspondingly by the same degree, and the third clutch 59 is brought into the connected state as shown in FIG. 10.

In this preferred embodiment, the gear ratio of the pair of third transmissions 83 is smaller than the gear ratio of the pair of first transmissions 86. Thus, the rotation speed of the tenth gear 65 becomes faster than the rotation speed of the second gear 63. Thus, rotation is transmitted from the input shaft 52 to the first rotation shaft 53 through the pair of third transmissions 83. Rotation of the first rotation shaft 53 is not transmitted to the input shaft 52 through the one-way rotation transmitting mechanism 96.

Rotation is transmitted from the first rotation shaft 53 to the output shaft 33 through the pair of first transmission gears 84, the pair of third transmission gears 98 and the pair of fourth transmission gears 120 like the operations at the time of the first speed.

Figure 10:
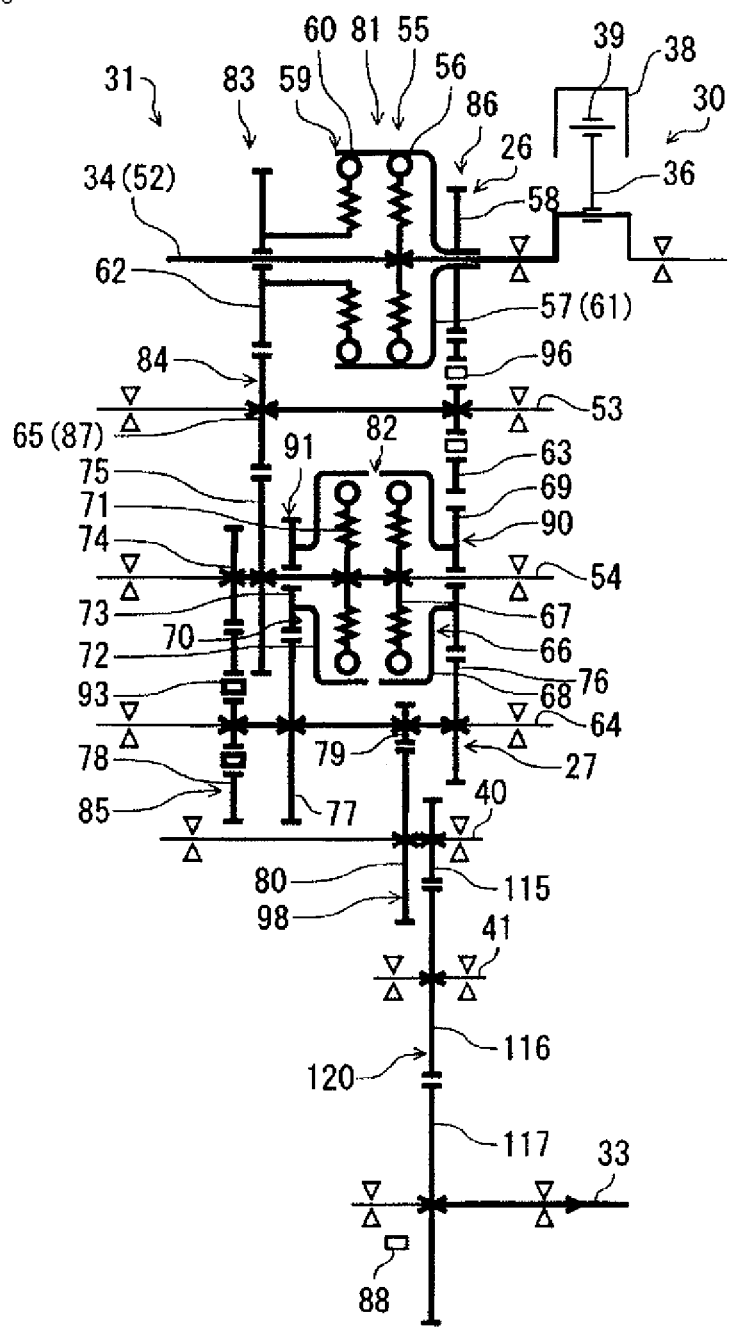
FIG. 10 is a schematic diagram for explaining the power transmission path at the time of the second speed in the transmission.

At the time of the second speed, as shown in FIG. 10, rotation is transmitted from the input shaft 52 to the output shaft 33 through the third clutch 59, the pair of third transmissions 83, the pair of first transmission gears 84, the pair of second transmission gears 85, the pair of third transmission gears 98 and the pair of fourth transmission gears 120.

Figure 7:
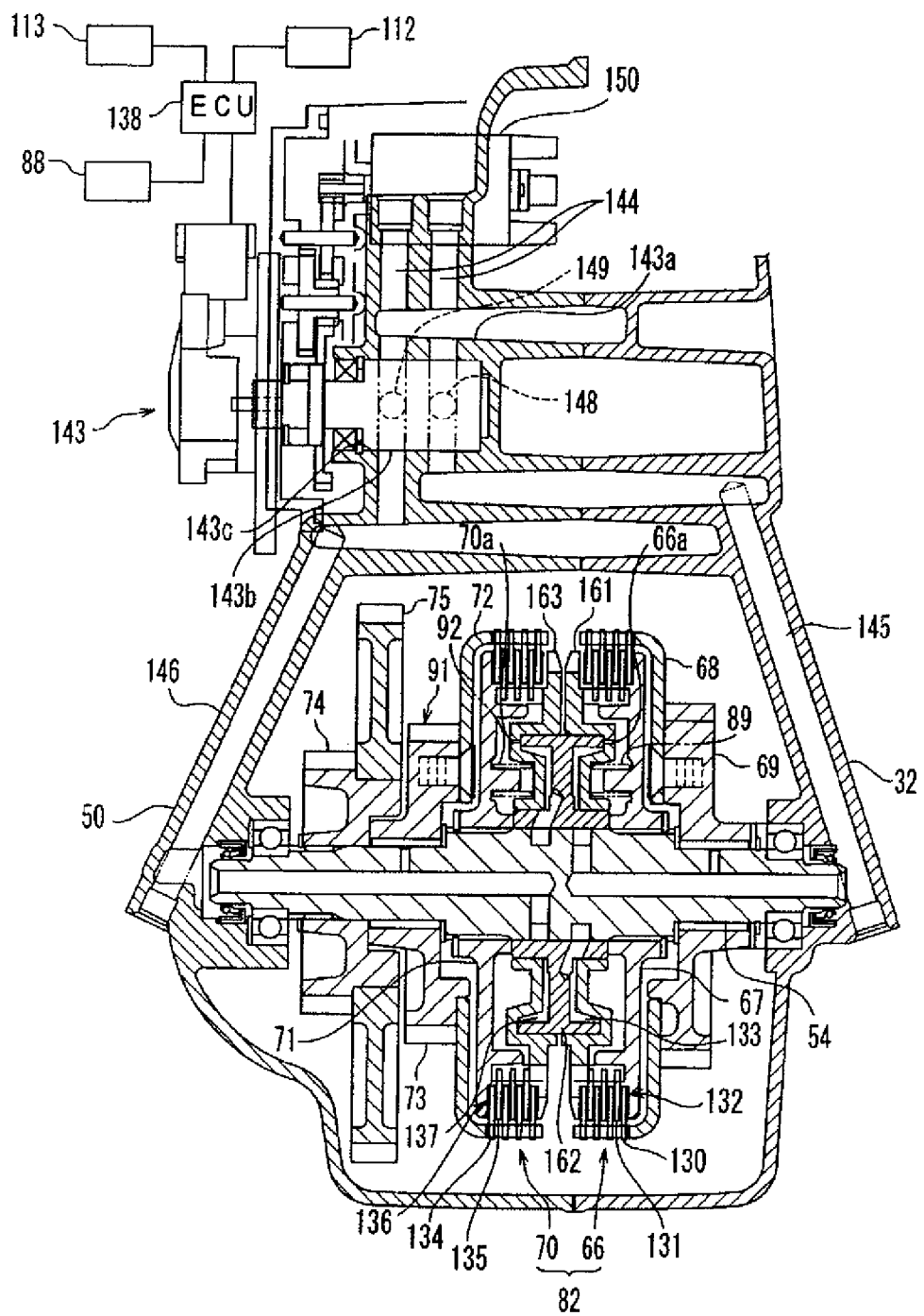
FIG. 7 is a partial sectional view of the engine unit showing a structure of a downstream clutch group.
Figure 11:
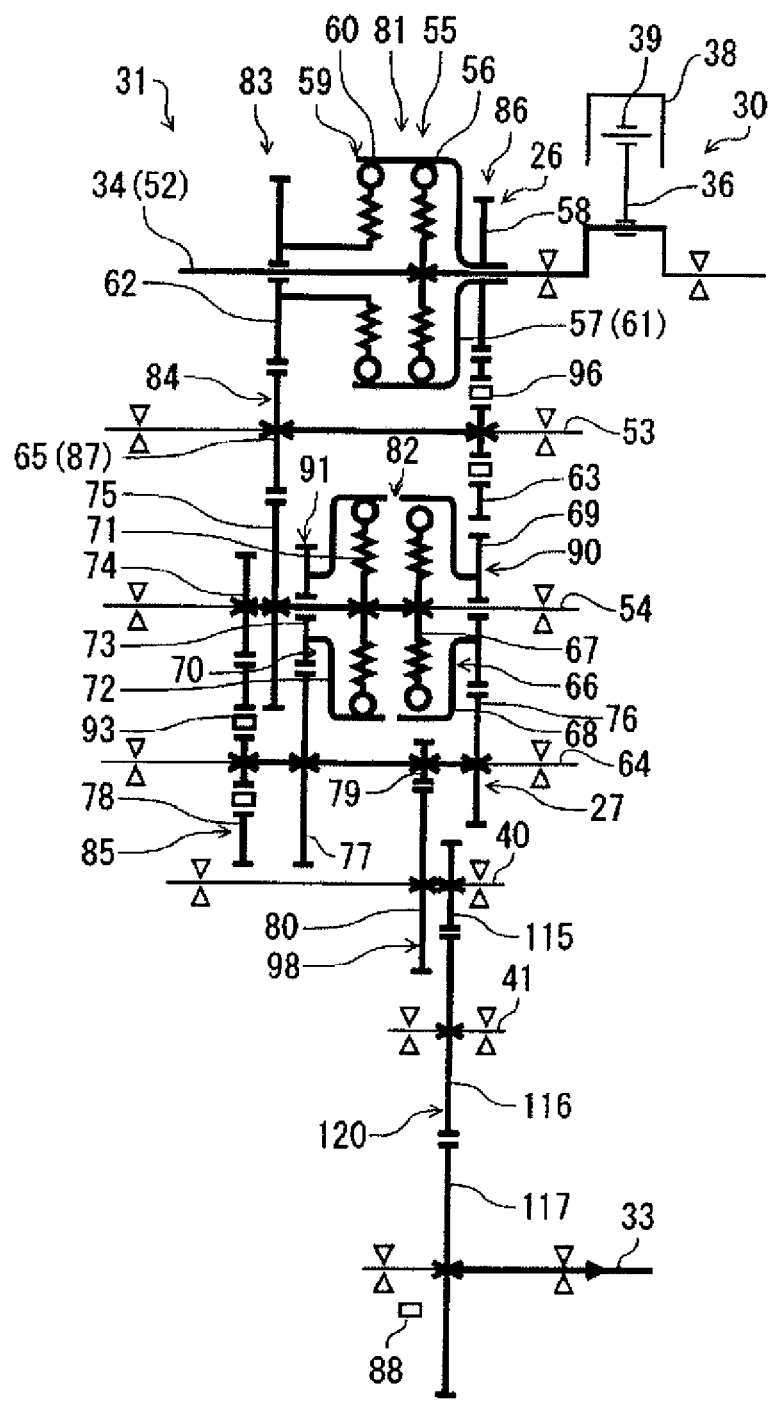
FIG. 11 is a schematic diagram for explaining the power transmission path at the time of the third speed in the transmission.

At the time of the second speed, if the rotation speed of the crankshaft 34 that is preferably integral with the input shaft 52 becomes higher than the second rotation speed and the vehicle speed becomes equal to or higher than a predetermined vehicle speed, the inner member 143b of the valve 143 shown in FIG. 7 is driven, and the inner member 143b assumes the first communication angle. As a result, the first oil path 144 and the third oil path 146 are connected to each other through the communication path 149. Thus, the second clutch 70 is brought into the connected state as shown in FIG. 11. The gear ratio of the pair of second transmissions 91 is smaller than the gear ratio of the pair of second transmission gears 85. Thus, the rotation speed of the eighth gear 77 of the pair of second transmissions 91 becomes higher than the rotation speed of the sixth gear 78 of the pair of third transmissions 83. Therefore, rotation of the second rotation shaft 54 is transmitted to the third rotation shaft 64 through the pair of second transmissions 91. Rotation of the third rotation shaft 64 is not transmitted to the second rotation shaft 54 through the one-way rotation transmitting mechanism 93.

Rotation of the third rotation shaft 64 is transmitted to the output shaft 33 through the pair of third transmission gears 98 and the pair of fourth transmission gears 120 like the operations at the time of the first speed and second speed.

At the time of the third speed, as shown in FIG. 11, rotation is transmitted from the input shaft 52 to the output shaft 33 through the third clutch 59, the pair of third transmissions 83, the pair of first transmission gears 84, the second clutch 70, the pair of second transmissions 91, the pair of third transmission gears 98 and the pair of fourth transmission gears 120.

At the time of the third speed, if the rotation speed of the crankshaft 34 that is preferably integral with the input shaft 52 increases and the vehicle speed becomes higher, the inner member 143b of the valve 143 shown in FIG. 7 is driven, and the inner member 143b assumes the second communication angle. As a result, the fourth clutch 66 is brought into the connected state and the second clutch 70 is brought into the disconnected state. The gear ratio of the pair of fourth transmissions 90 is smaller than the gear ratio of the pair of second transmission gears 85. Thus, the rotation speed of the twelfth gear 76 of the pair of fourth transmissions 90 becomes higher than the rotation speed of the sixth gear 78 of the pair of second transmission gears 85. Therefore, rotation of the second rotation shaft 54 is transmitted to the third rotation shaft 64 through the pair of fourth transmissions 90. Rotation of the third rotation shaft 64 is not transmitted to the second rotation shaft 54 through the one-way rotation transmitting mechanism 93.

Rotation of the third rotation shaft 64 is transmitted to the output shaft 33 through the pair of third transmission gears 98 and the pair of fourth transmission gears 120 like the operations at the time of the first speed to the third speed.

Figure 12:
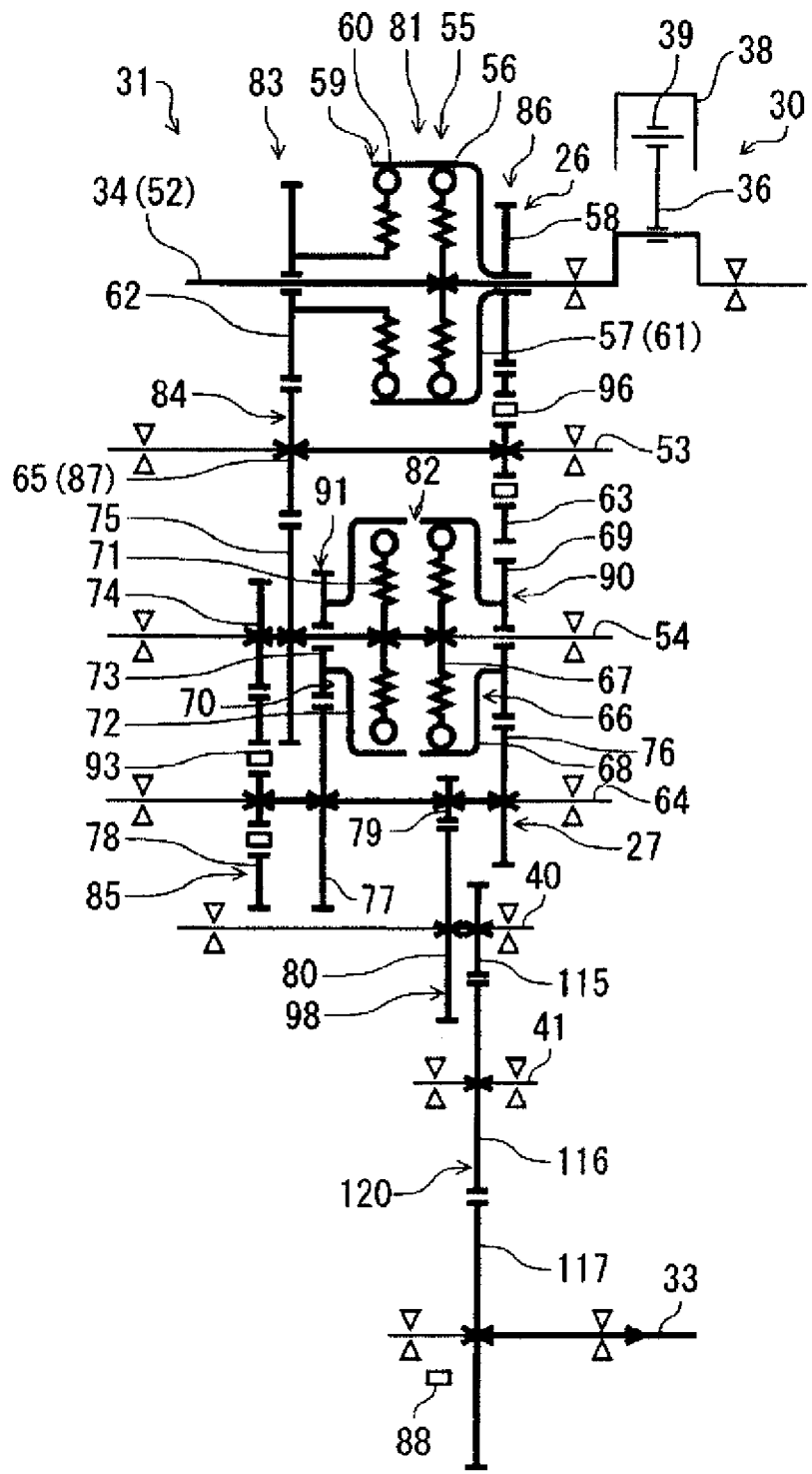
FIG. 12 is a schematic diagram for explaining the power transmission path at the time of the fourth speed in the transmission.

At the time of the fourth speed, as shown in FIG. 12, rotation is transmitted from the input shaft 52 to the output shaft 33 through the third clutch 59, the pair of third transmissions 83, the pair of first transmission gears 84, the fourth clutch 66, the pair of fourth transmissions 90, the pair of third transmission gears 98 and the pair of fourth transmission gears 120.

As described above, in the present preferred embodiment, the second rotation shaft 54 preferably is disposed at a location higher than the input shaft 52 as shown in FIG. 3. The front end 70b of the second clutch 70 preferably is located forward of the rear end 55a of the first clutch 55 as viewed from the axial center direction of the input shaft 52 in a direction perpendicular to the axis center of the input shaft 52 on a plane including the axis center of the input shaft 52 and the axis center of the output shaft 33. Therefore, a distance between the first clutch 55 and the second clutch 70 which are heavy loads can be shortened in the longitudinal direction. Therefore, it is possible to concentrate a longitudinal mass in the stepwise automatic transmission 31 and thus, in the engine unit 20 and the motorcycle 1.

When two clutches which are heavy loads are disposed on the input shaft 52 and the second rotation shaft 54 as in this preferred embodiment, the weight around the input shaft 52 and around the second rotation shaft 54 becomes especially heavy. Therefore, it is possible to concentrate a longitudinal mass more effectively.

When two clutches which are heavy loads are disposed on the input shaft 52 and the second rotation shaft 54, it is preferable that the front end of the downstream clutch group 82 is located forward of the rear end of the upstream clutch group 81 as viewed from the axial center direction of the input shaft 52 in a state where the motorcycle 1 is at rest as in this preferred embodiment. According to this structure, it is possible to concentrate a mass more effectively.

In this preferred embodiment, the stepwise automatic transmission 31 preferably is a unit swing type. Thus, when mass is not concentrated and a center of gravity is located on the back side, rigidity required for the pivot shaft 25 and the engine bracket 21 is increased. Therefore, the weight of the stepwise automatic transmission 31 tends to be increased.

While, on the other hand, in this preferred embodiment, a mass is concentrated, and the center of gravity of the stepwise automatic transmission 31 is located on the front side. Therefore, rigidity required for the pivot shaft 25 and the engine bracket 21 is low. Therefore, the weight of the stepwise automatic transmission 31 can be reduced.

Especially, when at least a portion of the engine bracket 21 is located forward of the axial center C1 of the input shaft 52 as shown in FIG. 3, if the center of gravity of the stepwise automatic transmission 31 is moved forward, the moment of inertia acting on the stepwise automatic transmission 31 can be reduced. Therefore, rigidity required for the pivot shaft 25 and the engine bracket 21 can further be reduced. Thus, the stepwise automatic transmission 31 can further be reduced in weight.

In this preferred embodiment where the stepwise automatic transmission 31 is of the unit swing type, since the mass is concentrated, a so-called unspring load can also be reduced.

Second Preferred Embodiment

In the first preferred embodiment, power transmission between the input shaft 52 and the output shaft 33 preferably is carried out only by a plurality of pairs of gears. However, power transmission between the input shaft 52 and the output shaft 33 may be carried out by a power transmission mechanism other than the pair of gears. For example, a chain may be used for power transmission in at least a portion of the power transmission path between the input shaft 52 and the output shaft 33.

Figure 13:
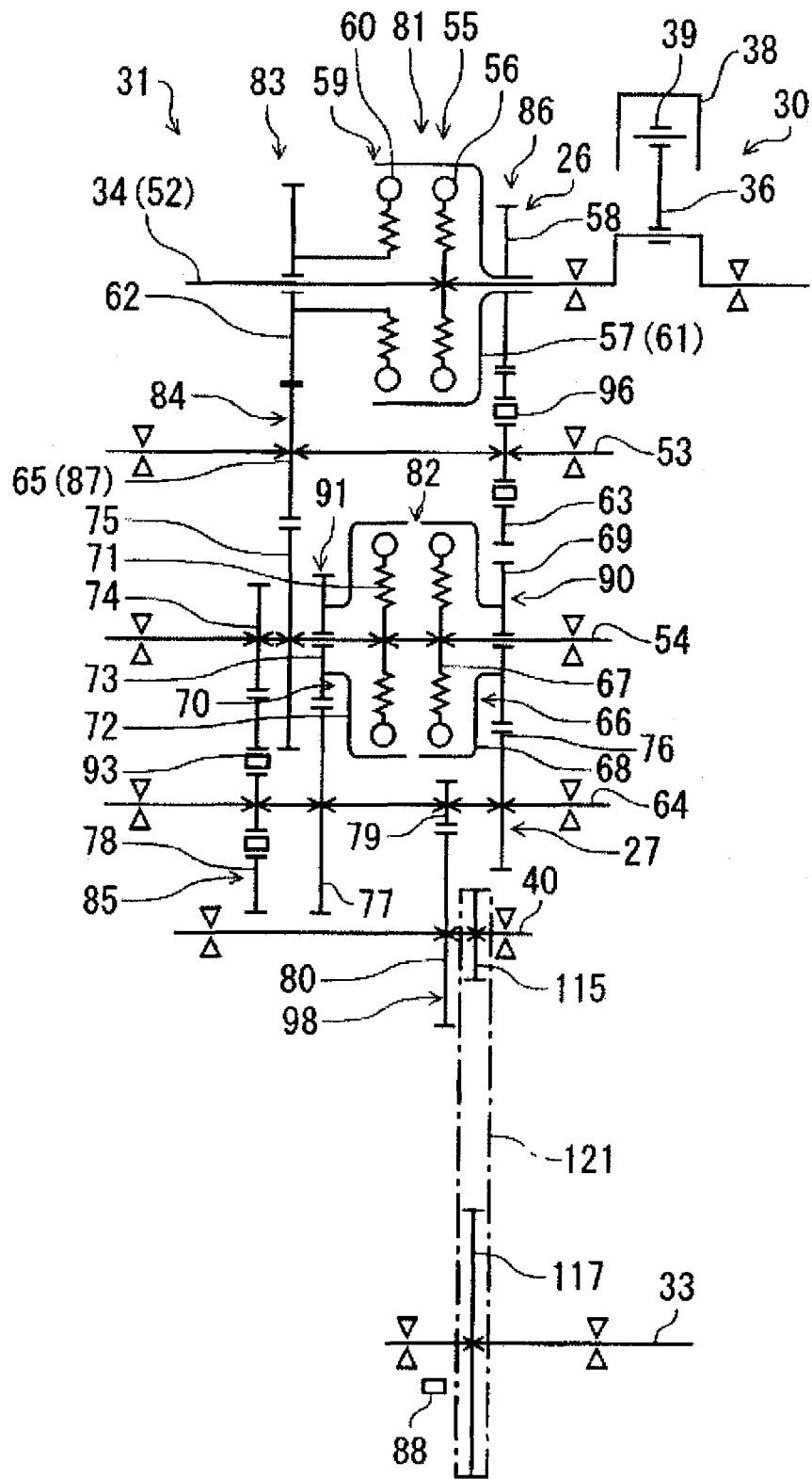
FIG. 13 is a schematic diagram showing a structure of an engine unit according to a second preferred embodiment of the present invention.
Figure 14:
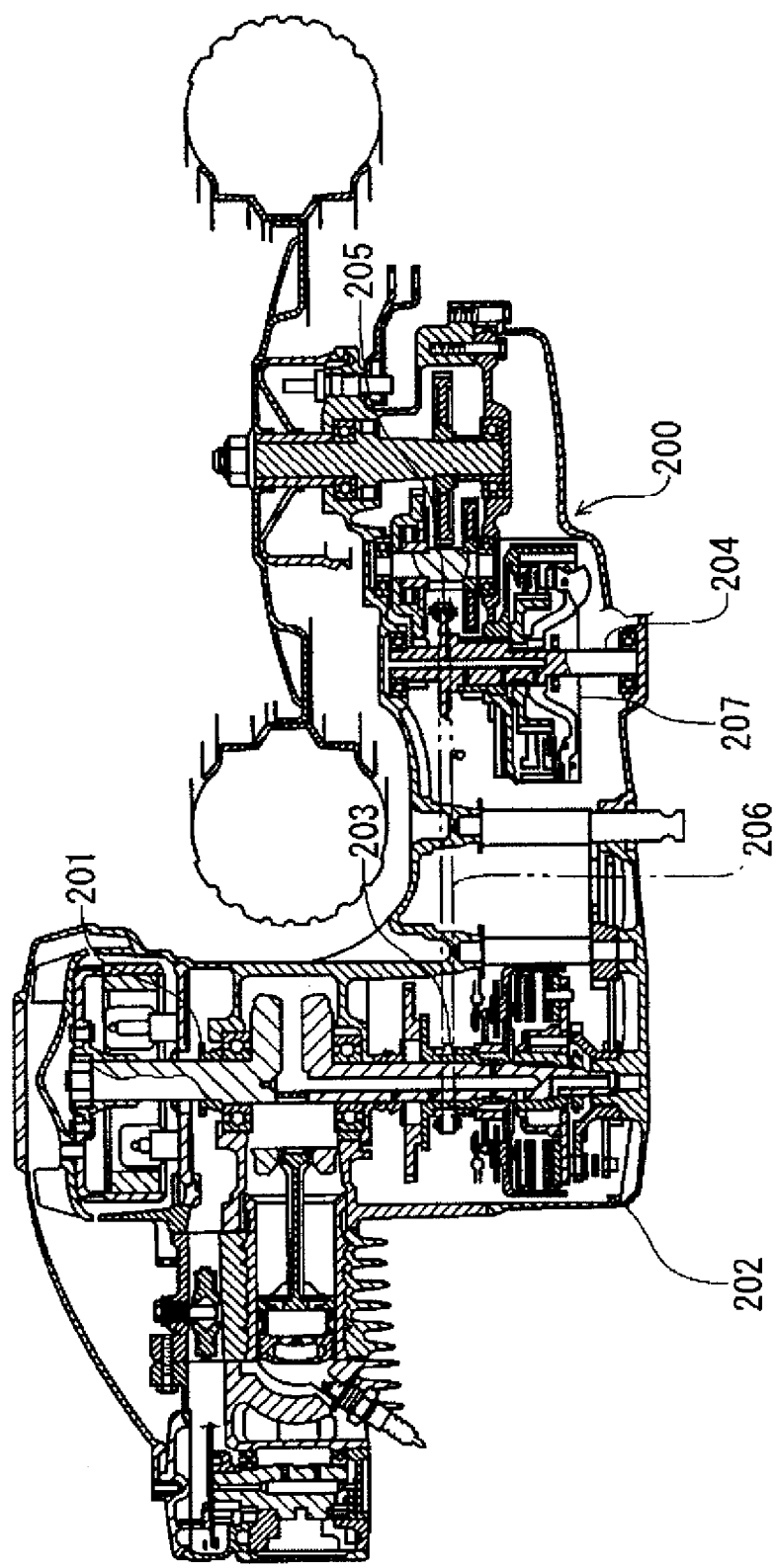
FIG. 14 is a sectional view of a stepwise automatic transmission disclosed in Japanese Utility Model Application Laid-Open No. 562-23349.

As shown in FIG. 13, a chain 121 may be used in a portion of the second power transmission mechanism 27. More specifically, in the example shown in FIG. 13, the chain 121 is wound around the fifteenth gear 115 and the seventeenth gear 117. With this, the fifth rotation shaft 41 and the sixteenth gear 116 shown in FIG. 6 become unnecessary. Therefore, the number of components of the transmission can be reduced.

Further, the power transmission between the input shaft 52 and any one of the first to fifth rotation shafts 53, 54, 64, 40 and 41 occurs via a chain.

Modifications of Preferred Embodiments

In the first preferred embodiment, a mounting center of the engine bracket 21 preferably is located downward of the axial center C1 of the input shaft 52. In the present invention, however, the positional relationship between the mounting center of the engine bracket 21 and the axial center C1 of the input shaft 52 is not especially limited. For example, the mounting center of the engine bracket 21 may be higher than the axial center C1 of the input shaft 52. The mounting center of the engine bracket 21 maybe substantially at the same height as the axial center C1 of the input shaft 52.

In the preferred embodiments of the present invention, description is made of a transmission that preferably is a unit swing type, as an example. However, the transmission of the present invention is not limited to the unit swing type. For example, the transmission may be fixed to the vehicle body frame such that the transmission cannot substantially be displaced.

In the first preferred embodiment, as shown in FIG. 3, the axial center C2 of the first rotation shaft 53 is preferably located lower than the axial center C4 of the third rotation shaft 64. The present invention is not limited to this structure. For example, the first rotation shaft 53 may be disposed such that the axial center C2 of the first rotation shaft 53 is located lower than the axial center C4 of the third rotation shaft 64. More specifically, the first rotation shaft 53 may be disposed such that the axial center C2 of the first rotation shaft 53 is located lower than the plane P. The third rotation shaft 64 may be disposed such that the axial center C4 of the third rotation shaft 64 is located lower than the plane P.

In the first preferred embodiment, both the cell motor and the kick starter are preferably provided. However, it is not always necessary that both the cell motor and the kick starter are provided. Only one of them may be provided.

In the first preferred embodiment, the outer member 57 of the first clutch 55 and the outer member 61 of the third clutch 59 are preferably constituted by the same member. However, the present invention is not limited to this structure. The outer member 57 of the first clutch 55 and the outer member 61 of the third clutch 59 may individually be provided.

In the first preferred embodiment, the one-way rotation transmitting mechanism 93 is preferably disposed with respect to the sixth gear 78. However, the present invention is not limited to this structure. For example, the one-way rotation transmitting mechanism 93 may be disposed with respect to the fifth gear 74.

In the first preferred embodiment, the one-way rotation transmitting mechanism 96 is preferably disposed with respect to the second gear 63. However, the present invention is not limited to this structure. For example, the one-way rotation transmitting mechanism 96 may be disposed with respect to the first gear 58.

In the first preferred embodiment, the first clutch 55 and the third clutch 59 are preferably disposed between the pair of first transmissions 86 and the pair of third transmissions 83. However, the present invention is not limited to this structure. For example, the first clutch 55 may be disposed on the left side of the pair of first transmissions 86, and the third clutch 59 may be disposed also on the left side of the pair of third transmissions 83.

Similarly, in the first preferred embodiment, the second clutch 70 and the fourth clutch 66 are preferably disposed between the pair of second transmissions 91 and the pair of fourth transmissions 90. However, the present invention is not limited to this structure. For example, the second clutch 70 may be disposed on the left side of the pair of second transmissions 91 and the fourth clutch 66 may also be disposed on the left side of the pair of fourth transmissions 90.

In the first preferred embodiment, the preferred mode for carrying out the present invention preferably is described based on the four-speed stepwise automatic transmission 31. However, the present invention is not limited to this structure. For example, the stepwise automatic transmission 31 maybe five or more speed. In such a case, two more rotation shafts are provided between the third rotation shaft 64 and the output shaft 33, and another clutch and another pair of transmissions are provided on each of the two shafts.

The stepwise automatic transmission 31 maybe a three-speed transmission. When constituting a three-speed transmission, a structure in which the fourth clutch 66 of the stepwise automatic transmission 31 and the pair of second transmissions 91 shown in FIG. 6 are not provided can be used, for example.

The stepwise automatic transmission 31 may be a two-speed transmission. When constituting a two-speed transmission, a structure in which the third clutch 59 of the stepwise automatic transmission 31, the pair of fourth transmissions 90, the one-way rotation transmitting mechanism 96, the fourth clutch 66 and the pair of second transmissions 91 are not provided may be used.

In the first preferred embodiment, the engine 30 preferably is a single-cylinder engine. However, in the present invention, the engine 30 is not limited to the single-cylinder engine. The engine 30 may be a multi-cylinder engine such as a two-cylinder engine.

In the first preferred embodiment, the pair of gears are arranged to mesh with each other directly. However, the present invention is not limited to this structure. The pair of gears may mesh with each other indirectly through another gear.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A stepwise automatic transmission for a straddle vehicle comprising:
    an input shaft extending in a vehicle width direction;
    an intermediate shaft disposed rearward of the input shaft; and
    an output shaft; wherein
    the stepwise automatic transmission includes:
        a first clutch which is connected or disconnected in accordance with a rotation speed of the input shaft;
        a first power transmission mechanism which transmits rotation of the input shaft to the intermediate shaft when the first clutch is connected;
        a second clutch which is provided on the intermediate shaft and which is connected or disconnected in accordance with a rotation speed of the intermediate shaft; and
        a second power transmission mechanism which transmits rotation of the intermediate shaft to the output shaft when the second clutch is connected; wherein
    a front end of the second clutch is located forward of a rear end of the first clutch as viewed from an axial direction of the input shaft;
    the first clutch and the second clutch overlap each other in a vehicle longitudinal direction such that a vertical plane extending in the vehicle width direction intersects each of the first clutch and the second clutch; and
    the first clutch and the second clutch overlap each other in the vehicle width direction such that a vertical plane extending in the vehicle longitudinal direction intersects a largest diameter portion of each of the first clutch and the second clutch.

2. The stepwise automatic transmission for a straddle vehicle according to claim 1, further comprising a casing which accommodates therein the input shaft, the intermediate shaft, the output shaft, the first and the second clutches, and the first and the second power transmission mechanisms;
    the casing includes a mounting portion which is mounted on the straddle vehicle; and
    the casing is mounted on the straddle vehicle so as to be swingable.

3. The stepwise automatic transmission for a straddle vehicle according to claim 2, wherein at least a portion of the mounting portion is located forward of an axis of the input shaft.

4. The stepwise automatic transmission for a straddle vehicle according to claim 3, wherein a mounting center of the mounting portion as viewed from a side of the straddle vehicle is located lower than the axis of the input shaft.

5. The stepwise automatic transmission for a straddle vehicle according to claim 1, wherein the first power transmission mechanism includes at least one pair of gears which transmits the rotation of the input shaft to the intermediate shaft.

6. The stepwise automatic transmission for a straddle vehicle according to claim 1, wherein the second power transmission mechanism includes at least one pair of gears which transmits the rotation of the intermediate shaft to the output shaft.

7. The stepwise automatic transmission for a straddle vehicle according to claim 1, wherein the second power transmission mechanism includes a chain which transmits the rotation of the intermediate shaft to the output shaft.

8. The stepwise automatic transmission for a straddle vehicle according to claim 1, further comprising a third clutch which is connected or disconnected in accordance with the rotation speed of the input shaft; wherein
    a rotation speed of the input shaft when the third clutch is connected is higher than the rotation speed of the input shaft when the first clutch is connected; and
    when the third clutch is connected, the first power transmission mechanism transmits the rotation of the input shaft to the intermediate shaft at a transmission gear ratio smaller than that when the first clutch is connected.

9. The stepwise automatic transmission for a straddle vehicle according to claim 8, further comprising a fourth clutch which is connected or disconnected in accordance with the rotation speed of the intermediate shaft; wherein
    a rotation speed of the intermediate shaft when the fourth clutch is connected is higher than the rotation speed of the intermediate shaft when the second clutch is connected; and
    when the fourth clutch is connected, the second power transmission mechanism transmits the rotation of the intermediate shaft to the output shaft at a transmission gear ratio smaller than that when the second clutch is connected.

10. A power unit comprising:
    the stepwise automatic transmission for a straddle vehicle according to claim 1; and
    a power source arranged to rotate the input shaft.

11. A straddle vehicle comprising:
the power unit according to claim 10.

12. The stepwise automatic transmission for a straddle vehicle according to claim 1, wherein the first clutch and the second clutch substantially overlap each other in the vehicle width direction.

\* \* \* \* \*